(12) United States Patent
Thomas et al.

(10) Patent No.: US 12,514,843 B2
(45) Date of Patent: Jan. 6, 2026

(54) BIOFILM DISRUPTION

(71) Applicant: QBIOTICS PTY LTD, Taringa (AU)

(72) Inventors: David William Thomas, Cardiff (GB); Paul Warren Reddell, Yungaburra (AU); Glen Mathew Boyle, Taringa (AU); Jason Kingsley Cullen, Thornside (AU); Victoria Anne Gordon, Yungaburra (AU); Katja Etel Hill, Cardiff (GB); Lydia Charlotte Powell, Neath (GB); Manon F. Pritchard, Whitchurch (GB); Peter G. Parsons, St. Lucia (AU)

(73) Assignee: QBIOTICS PTY LTD, Queensland (AU)

( * ) Notice: Subject to any disclaimer, the term of this patent is extended or adjusted under 35 U.S.C. 154(b) by 1055 days.

(21) Appl. No.: 17/620,517

(22) PCT Filed: Jun. 19, 2020

(86) PCT No.: PCT/AU2020/050623
§ 371 (c)(1),
(2) Date: Dec. 17, 2021

(87) PCT Pub. No.: WO2020/252535
PCT Pub. Date: Dec. 24, 2020

(65) Prior Publication Data
US 2022/0313648 A1    Oct. 6, 2022

(30) Foreign Application Priority Data

Jun. 19, 2019   (AU) .................................. 2019902144

(51) Int. Cl.
*A61K 31/336*    (2006.01)
*A61K 45/06*    (2006.01)
*A61P 31/04*    (2006.01)

(52) U.S. Cl.
CPC .......... *A61K 31/336* (2013.01); *A61K 45/06* (2013.01); *A61P 31/04* (2018.01)

(58) Field of Classification Search
CPC ........ A61K 31/336; A61K 45/06; A61P 31/04
See application file for complete search history.

(56) References Cited

U.S. PATENT DOCUMENTS

| 2009/0182042 A1 | 7/2009 | Reddell et al. |
| 2016/0068499 A1* | 3/2016 | Reddell ................ A61K 9/0019 549/543 |
| 2022/0193023 A1 | 6/2022 | Gordon et al. |

FOREIGN PATENT DOCUMENTS

| JP | 2018087161 A | 6/2018 |
| WO | WO-2007070985 A1 | 6/2007 |
| WO | WO-2011091322 A2 | 7/2011 |
| WO | WO 2014/169356 A1 | 10/2014 |
| WO | WO-2014186059 A1 | 11/2014 |
| WO | WO-2016080846 A1 | 5/2016 |
| WO | WO-2018170559 A1 | 9/2018 |

OTHER PUBLICATIONS

Sabesan (Frontiers in Medicine. 2014. 1 (22) 1-4). (Year: 2014).*
Ashby (Journal of Antimicrobial Chemotherapy (1994) 33, 443-152). (Year: 1994).*
International Search Report for International Application No. PCT/AU2020/050623, mailed on Jul. 31, 2020, Australian Patent Office, Australia, 5 pages.
Written Opinion of the International Authority for International Application No. PCT/AU2020/050623, mailed on Jul. 31, 2020, Australian Patent Office, Australia, 4 pages.
Phillips, P.L., et al., "Biofilms made easy," Wounds International 1(3):1-6 (2010).
QBiotics Limited, Prospectus, Public Share Offer, Jul. 29, 2016, 115 pages.
Brinkmann, V., et al., "Neutrophil extracellular traps: how to generate and visualize them," J. Vis. Exp. 36:e1724, MyJove Corp, United States (Feb. 2010).
Cao, H., et al., "Revealing region-specific biofilm viscoelastic properties by means of a micro-rheological approach," NPJ Biofilms Microbiomes 2:5, Springer Nature, Germany (Dec. 2016).
Cepas, V., et al., "Relationship Between Biofilm Formation and Antimicrobial Resistance in Gram-Negative Bacteria," Microb. Drug Resist. 25(1):72-79, Mary Ann Liebert Inc., United States (Aug. 2018).
Dhall, S., et al., "Generating and reversing chronic wounds in diabetic mice by manipulating wound redox parameters," J. Diabetes Res. 2014:1-18, Hindawi, United Kingdom (Dec. 2014).
Doi, Y., et al., "Gram-Negative Bacterial Infections: Research Priorities, Accomplishments, and Future Directions of the Antibacterial Resistance Leadership Group," Clin. Infect. Dis. 64(S1):S30-S35, Oxford University Press, United Kingdom (Mar. 2017).
Fleming, D., et al., "Approaches to Dispersing Medical Biofilms," Microorganisms 5(2):15, MDPI, Switzerland (Apr. 2017).

(Continued)

*Primary Examiner* — Kortney L. Klinkel
*Assistant Examiner* — Richard Grant Peckham
(74) *Attorney, Agent, or Firm* — Knobbe, Martens, Olson & Bear, LLP

(57) ABSTRACT

The present invention relates to methods of dispersing biofilms comprising Gram-negative bacteria, the methods comprising exposing the biofilm to an epoxytiglienone compound or a salt thereof. Methods of treating infections comprising the localised administration, for example, topically or by injection, of an epoxytiglienone compound into or onto an established biofilm comprising Gram-negative bacteria to disrupt the structure of that biofilm and methods of preventing biofilms comprising Gram-negative bacteria forming or dispersing biofilms comprising Gram-negative biofilms that have formed on medical devices are also described.

14 Claims, 10 Drawing Sheets

(56) References Cited

OTHER PUBLICATIONS

Gunn, J.S., et al., "What's on the Outside Matters: The Role of the Extracellular Polymeric Substance of Gram-negative Biofilms in Evading Host Immunity and as a Target for Therapeutic Intervention," J. Biol. Chem. 291(24):12538-12546, American Society for Biochemistry and Molecular Biology, United States (Jun. 2016).
Ho, J., et al., "Multiresistant Gram-negative infections: a global perspective," Curr. Opin. Infect. Dis. 23(6):546-553, Lippincott Williams & Wilkins, United States (Dec. 2010).
Hoiby, N., et al., "Antibiotic resistance of bacterial biofilms," Int. J. Antimicrob. Agents 35(4):322-332, Elsevier, Netherlands (Apr. 2010).
Hoiby, N., et al., "ESCMID guideline for the diagnosis and treatment of biofilm infections 2014," Clin. Microbiol. Infect. 21(Suppl 1):S1-S25, Elsevier, Netherlands (Jan. 2015).
Jorgensen, J.H., et al., "Susceptibility test methods: dilution and disk diffusion methods," in Manual of Clinical Microbiology, Chapter 71, Murray, P.R., Eds., pp. 1253-1273, ASM Press, United States (May 2015).
Koo, H., et al., "Targeting microbial biofilms: current and prospective therapeutic strategies," Nat. Rev. Microbiol. 15(12):740-755, Springer Nature, Germany (Sep. 2017).
Lee, J-H., et al., "Antibiofilm activities of norharmane and its derivatives against *Escherichia coli* O157:H7 and other bacteria," Phytomedicine 36:254-261, Elsevier GmbH, Germany, (Dec. 2017).
Powell, L.C., et al., "Targeted disruption of the extracellular polymeric network of *Pseudomonas aeruginosa* biofilms by alginate oligosaccharides," NPJ Biofilms Microbiomes 4:13, Springer Nature, Germany (Jun. 2018).
QBiotics Group, Prospectus, Public Share Offer dated Oct. 26, 2018, 158 pages, QBiotics Group Limited.
Zhao, G., et al., "Delayed wound healing in diabetic (db/db) mice with *Pseudomonas aeruginosa* biofilm challenge: a model for the study of chronic wounds," Wound Rep. Reg. 18(5):467-477, The Wound Healing Society, United States (Sep. 2010).
Jorgensen, J.H., et al., "Antibacterial Susceptibility Tests: Dilution and Disk Diffusion Methods," in Manual of Clinical Microbiology, Chapter 118, Baron, E., Ed., 7$^{th}$ Ed., pp. 1526-1543, American Society for Microbiology, Washington DC, United States (1999).
Boyle, G.M., et al., "Intra-Lesional Injection of the Novel PKC Activator EBC-46 Rapidly Ablates Tumors in Mouse Models," PLOS One 9(10):e108887, Public Library of Science, United States (Oct. 2014).
Chen, C., et al., "Characterization of serine acetyltransferase (CysE) from methicillin-resistant *Staphylococcus aureus* and inhibitory effect of two natural products on CysE," Microb Pathog 131:218-226, Elsevier, Netherlands (available online Apr. 9, 2019).
QBiotics Limited, Prospectus, Public Share Offer, Aug. 16, 2016, 120 pages.
Cepas et al., "Relationship Between Biofilm Formation and Antimicrobial Resistance in Gram-Negative Bacteria" Microbial Drug Resistance (2019) 25(1):72-79.
Ciofu et al., "Antibiotic treatment of biofilm infections" APMIS (2017) 125:304-319.
Doi et al., Clinical Infectious Diseases (2017) 64(Supple 1):S30-S35.
Ho et al., "Multiresistant Gram-negative infections: a global perspective" Current Opinion in Infectious Diseases (2010) 23:546-553.
Hoiby et al., "Antibiotic resistance of bacterial biofilms" International Journal of Antimicrobial Agents (2010) 35:322-332.
Mirghani et al., "Biofilms: Formulation, drug resistance and alternatives to conventional approaches" AIMS Microbiology (2022) 8(3):239-277.
STN RN 943001-56-7, entered Jul. 20, 2007.
STN RN 1633006-32-2, entered Nov. 14, 2014.
Office Action dated May 15, 2025 for KR Application No. 10-2022-7001798, filed Jun. 19, 2020.
Written Opinion dated May 8, 2025 for SG Application No. 11202113688X filed Jun. 19, 2020.

* cited by examiner

Figure 5A  *A. baumannii*
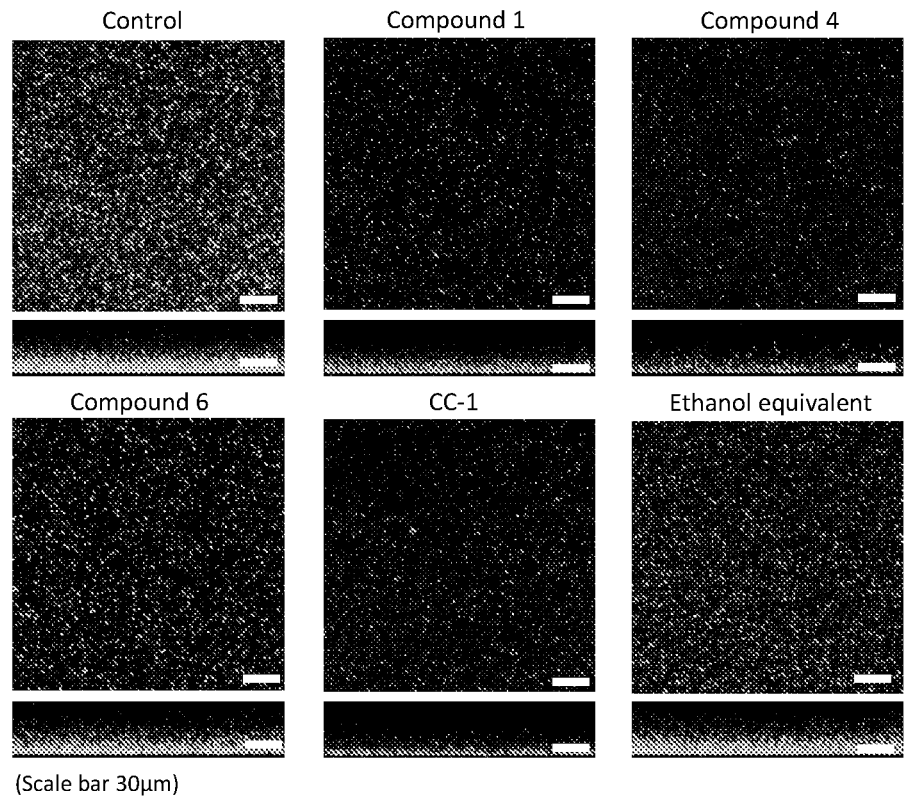
(Scale bar 30μm)
Figure 5B  *P. aeruginosa*
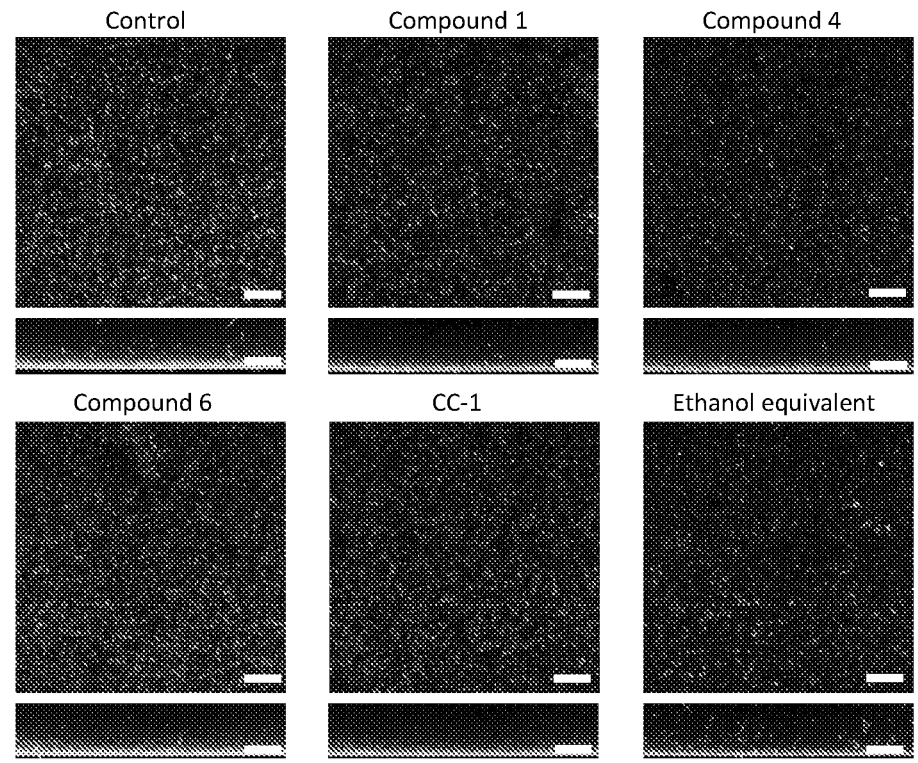

Figure 6A  *A. baumannii*
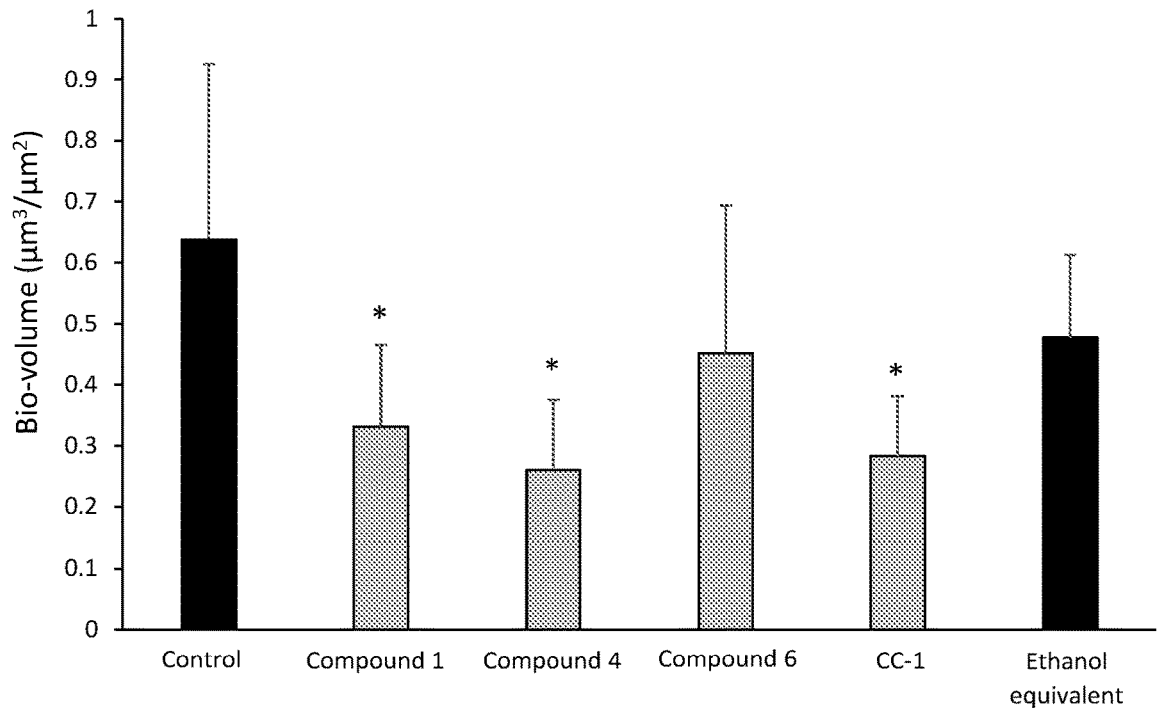
Figure 6B  *P. aeruginosa*
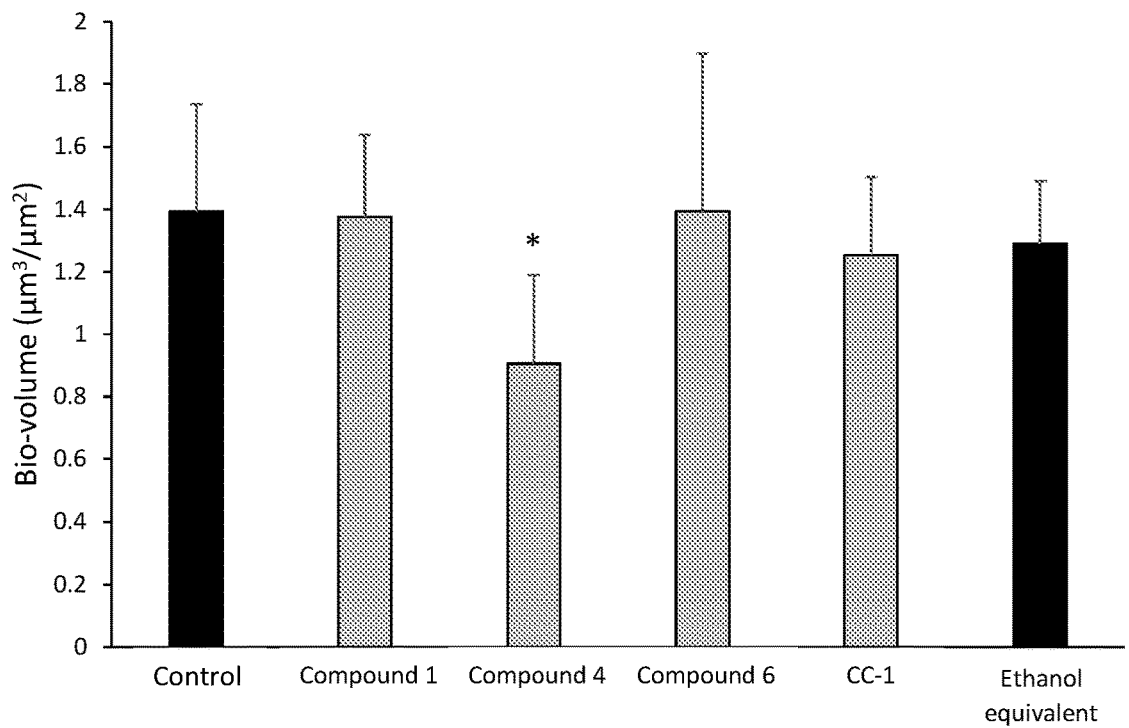

Figure 6C  *A. baumannii*
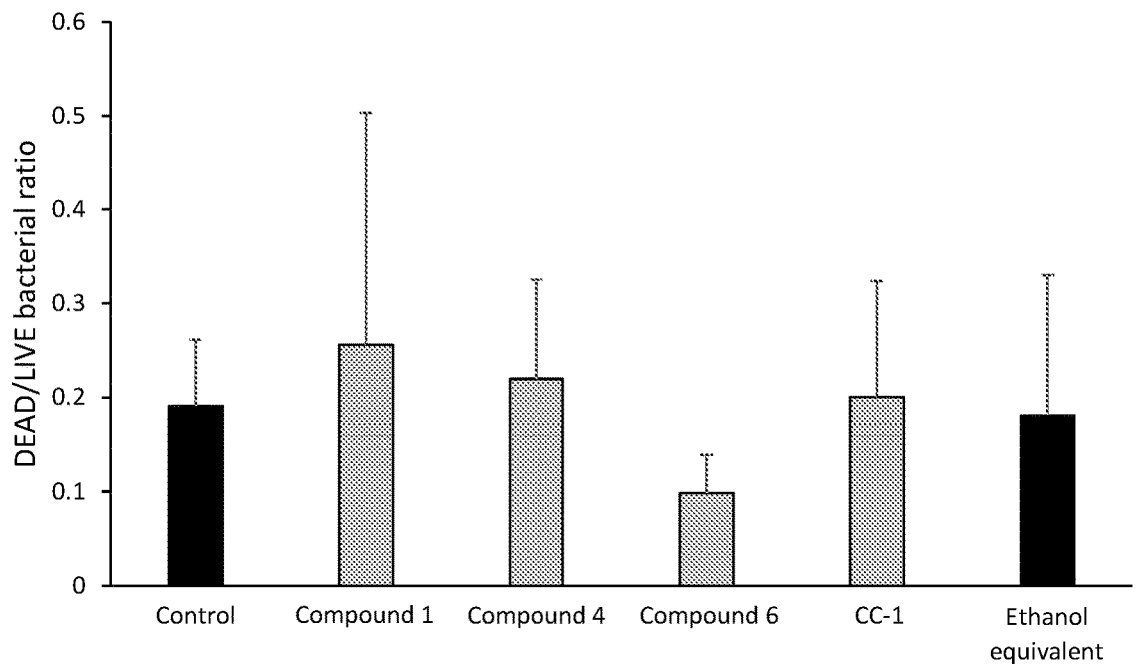
Figure 6D  *P. aeruginosa*
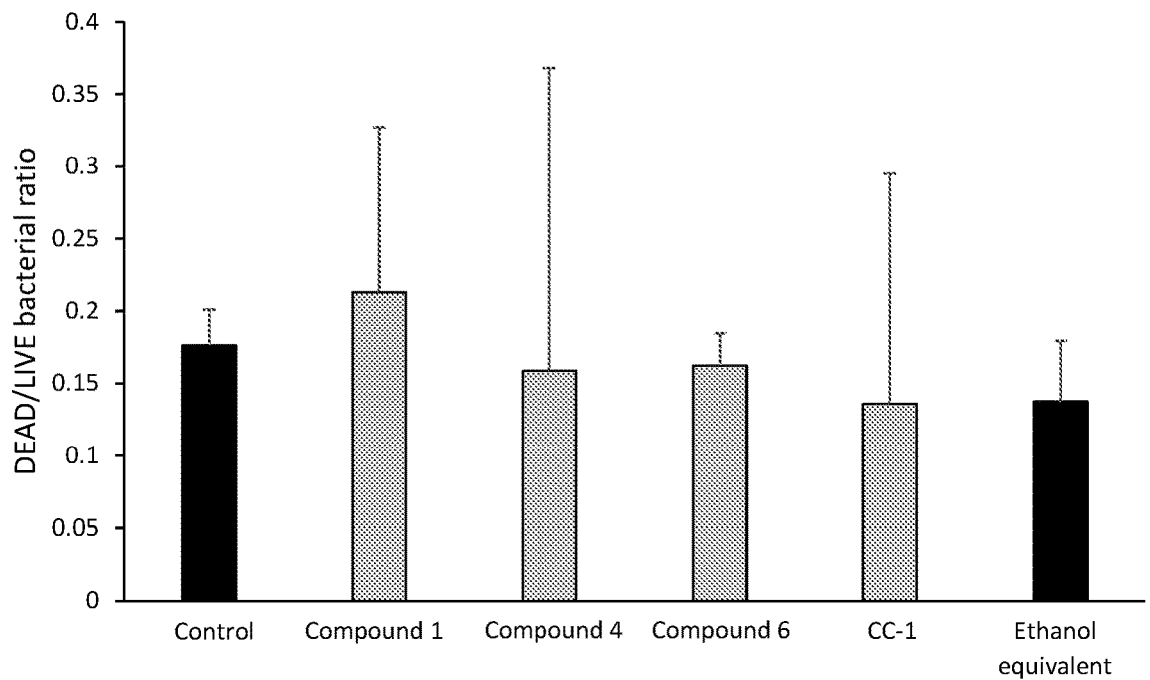

BIOFILM DISRUPTION

FIELD OF THE INVENTION

The present invention relates to methods of dispersing biofilms comprising Gram-negative bacteria, the methods comprising exposing the biofilm to an epoxytiglienone compound or a salt thereof. Methods of treating infections comprising the localised administration, for example, topically or by injection, of an epoxytiglienone compound into or onto an established biofilm comprising Gram-negative bacteria to disrupt the structure of that biofilm and methods of preventing biofilms comprising Gram-negative bacteria forming or dispersing biofilms comprising Gram-negative biofilms that have formed on medical devices are also described.

BACKGROUND OF THE INVENTION

Gram-negative bacteria are associated with a range of infections of the respiratory, urinogenital and gastro-intestinal tracts and of the circulatory system. They are also a major factor in the persistence of chronic wounds, of osteomyelitis, and of surgical site, medical device and post-implant infections. Serious infections with Gram-negative bacteria can cause significant morbidity and mortality, especially in immunocompromised patients. The most important clinical Gram-negative pathogens are *Pseudomonas aeruginosa, Acinetobacter baumannii* and members of the Enterobacteriaceae, especially *Escherichia coli* and *Klebsiella pneumoniae*. Examples of other medically relevant Gram-negative bacteria include *Neisseria* species (which cause gonorrhoea and meningitis), *Hemophilus influenzae, Legionella pneumophila, Yersinia pestis, Proteus mirabilis* and *Salmonella* species.

The treatment of infections of Gram-negative bacteria has become increasingly problematic due both to (a) the emergence and spread, amongst many of these microbes, of multidrug resistance to most, or all, conventional antibiotics (Ho et al. 2010; Doi et al. 2017) and (b) their ability to form recalcitrant, aggregated communities called biofilms (Cepas et al. 2019). The management of recalcitrant Gram-negative biofilms in particular poses a complex and challenging clinical problem with limited treatment options. Current strategies in many clinical situations involve removal (where feasible) of the biofilm by aggressive physical methods (e.g. debridement) coupled with high-dose and often prolonged antibacterial chemotherapy as standard of care (Hoiby et al. 2015). However, complete eradication of the biofilm with these methods is often unsuccessful leading to recurrence and selection for increased levels of bacterial resistance. This vicious cycle of chronicity further erodes the efficacy of antibiotics and facilitates the more widespread use of 'last resort' antibiotics, many of which have significant side effects.

There is an urgent need for new agents to treat Gram-negative biofilm infections. While traditional approaches to treating bacterial infections have been antibiotic-based and focused on directly targeting and inhibiting or killing the causal pathogens (using concepts of minimal inhibitory concentration (MIC) and minimal bactericidal concentration (MBC)), the complex nature of biofilms means that new therapeutic strategies are required.

Biofilms are bacterial communities embedded in a protective, self-produced matrix of extracellular polymeric substances (EPS) formed from polysaccharides, proteins, lipids and nucleic acids (RNA and extracellular DNA). Living in the biofilm, the resident bacteria are significantly more tolerant to antibiotics compared to their planktonic free-living counterparts (Hoiby et al. 2010) and are largely protected from the host's immune system. Much of this resistance of biofilms can be attributed to the EPS, which presents a formidable physical barrier to penetration of antibiotics and cellular effectors of immunity (Gunn et al. 2016). The structure of biofilms as a dense polymeric 'mesh' of EPS and bacteria also means they are highly resistant to removal from tissue and material surfaces to which they strongly adhere.

In contrast to the current standards of care, which are critically dependent on antibiotics, a range of 'non-antibiotic' strategies to treat Gram-negative biofilms have been proposed and are currently under investigation. These include interfering with signalling networks in biofilms, targeting biofilm adhesion, and disrupting the EPS matrix of biofilms (Koo et al. 2017). Unlike conventional antibiotics, these strategies also have the potential benefit of minimising the development of resistance as they target bacterial 'virulence factors' rather than bacterial growth and hence induce low selection pressure.

Of these 'non-antibiotic' strategies, disrupting the integrity of the EPS matrix of established biofilms is a particularly attractive. By making the EPS matrix more permeable, disaggregating the bacteria and interfering with the pathogenic signalling network, this strategy theoretically makes the individual bacteria more accessible to the immune system and/or to the potentiating the action of antibiotics (Gunn et al. 2016; Fleming & Rumbaugh 2017). Using this approach, a range of therapies involving enzymes (proteases, DNases, glycoside hydrolases), peptides, monoclonal antibodies and polymers that target specific components of the matrix (e.g. exopolysaccharides and eDNA) are under investigation (Koo et al. 2017).

Epoxytiglienones are small molecules with a range of bioactive properties. They are potent anti-tumour compounds, have antiparasitic properties, and stimulate immune and other cellular responses that promote healing of acute and chronic wounds. Previously, epoxytiglienones have been reported to have direct antibiotic activity against a range of Gram-positive bacteria (WO2007/070985 and WO2014/169356). However, in recent studies to more specifically evaluate the antibiotic properties of epoxytiglienone compounds against pathogenic strains of three Gram-negative pathogens (*E. coli, P. aeruginosa* and *A. baumannii*), no antibiotic effects have been found and it was not possible to establish a minimal inhibitory concentration (MIC) in conventional planktonic culture systems used for routine antibiotic screening.

The present invention is predicated, at least in part, on the subsequent, unexpected discovery that despite the absence of any direct antibiotic activity against planktonic Gram-negative bacteria, epoxytiglienones have potent, 'non-antibiotic' effects on established biofilms of a range of Gram-negative bacteria.

SUMMARY OF THE INVENTION

In a first aspect of the invention there is provided a method of dispersing a biofilm comprising Gram-negative bacteria, said method comprising exposing the biofilm to an epoxytiglienone compound for formula (I):

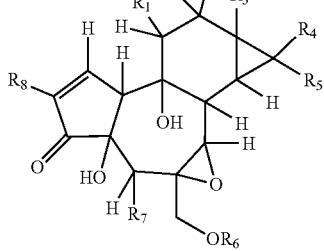

(I)

wherein $R_1$ is selected from hydrogen and $C_{1-6}$alkyl;

$R_2$ is selected from —$OC_{1-8}$alkyl, —$OC_{2-8}$alkenyl, —$OC_{2-8}$alkynyl, —$OC(O)C_{1-7}$alkyl, —$OC(O)C_{2-7}$alkenyl and —$OC(O)C_{2-7}$alkynyl;

$R_3$ is selected from —OH, —$OC_{1-8}$alkyl, —$OC_{2-8}$alkenyl, —$OC_{2-8}$alkynyl, —$OC(O)C_{1-7}$alkyl, —$OC(O)C_{2-7}$alkenyl and —$OC(O)C_{2-7}$alkynyl;

$R_4$ and $R_5$ are independently selected from hydrogen and $C_{1-6}$alkyl;

$R_6$ is selected from hydrogen, —$C_{1-6}$alkyl, —$C_{2-6}$alkenyl, —$C_{2-6}$alkynyl, —$C(O)C_{1-6}$alkyl, —$C(O)C_{2-6}$alkenyl, —$C(O)C_{2-6}$alkynyl, —$C(O)C_{3-8}$cycloalkyl, —$C(O)C_{1-6}$alkyl$C_{3-8}$cycloalkyl, —$C(O)C_{2-6}$alkenyl$C_{3-8}$cycloalkyl, —$C(O)C_{2-6}$alkynyl$C_{3-8}$cycloalkyl, —$C(O)$aryl, —$C(O)C_{1-6}$alkylaryl, —$C(O)C_{2-6}$alkenylaryl and —$OC(O)C_{2-6}$alkynylaryl;

$R_7$ is selected from hydroxy, —$OC_{1-6}$alkyl, —$OC_{2-6}$alkenyl, —$OC_{2-6}$alkynyl, —$OC(O)C_{1-6}$alkyl, —$OC(O)C_{2-6}$alkenyl, —$OC(O)C_{2-6}$alkynyl, —$C(O)C_{3-8}$cycloalkyl, —$C(O)C_{1-6}$alkyl$C_{3-8}$cycloalkyl, —$C(O)C_{2-6}$alkenyl$C_{3-8}$cycloalkyl, —$C(O)C_{2-6}$alkynyl$C_{3-8}$cycloalkyl, —$OC(O)$aryl, —$OC(O)C_{1-6}$alkylaryl, —$C(O)C_{2-6}$alkenylaryl and —$C(O)C_{2-6}$alkynylaryl;

$R_8$ is selected from hydrogen and $C_{1-6}$alkyl; or a salt thereof.

In another aspect of the invention there is provided a method of treating a bacterial infection comprising a biofilm comprising Gram-negative bacteria, said method comprising locally administering to the bacterial infection an epoxytiglienone compound of formula (I):

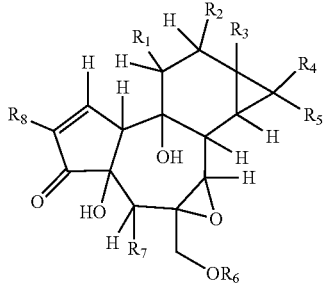

(I)

wherein $R_1$ is selected from hydrogen and $C_{1-6}$alkyl;

$R_2$ is selected from —$OC_{1-8}$alkyl, —$OC_{2-8}$alkenyl, —$OC_{2-8}$alkynyl, —$OC(O)C_{1-7}$alkyl, —$OC(O)C_{2-7}$alkenyl and —$OC(O)C_{2-7}$alkynyl;

$R_3$ is selected from —OH, —$OC_{1-8}$alkyl, —$OC_{2-8}$alkenyl, —$OC_{2-8}$alkynyl, —$OC(O)C_{1-7}$alkyl, —$OC(O)C_{2-7}$alkenyl and —$OC(O)C_{2-7}$alkynyl;

$R_4$ and $R_5$ are independently selected from hydrogen and $C_{1-6}$alkyl;

$R_6$ is selected from hydrogen, —$C_{1-6}$alkyl, —$C_{2-6}$alkenyl, —$C_{2-6}$alkynyl, —$C(O)C_{1-6}$alkyl, —$C(O)C_{2-6}$alkenyl, —$C(O)C_{2-6}$alkynyl, —$C(O)C_{3-8}$cycloalkyl, —$C(O)C_{1-6}$alkyl$C_{3-8}$cycloalkyl, —$C(O)C_{2-6}$alkenyl$C_{3-8}$cycloalkyl, —$C(O)C_{2-6}$alkynyl$C_{3-8}$cycloalkyl, —$C(O)$aryl, —$C(O)C_{1-6}$alkylaryl, —$C(O)C_{2-6}$alkenylaryl and —$OC(O)C_{2-6}$alkynylaryl;

$R_7$ is selected from hydroxy, —$OC_{1-6}$alkyl, —$OC_{2-6}$alkenyl, —$OC_{2-6}$alkynyl, —$OC(O)C_{1-6}$alkyl, —$OC(O)C_{2-6}$alkenyl, —$OC(O)C_{2-6}$alkynyl, —$C(O)C_{3-8}$cycloalkyl, —$C(O)C_{1-6}$alkyl$C_{3-8}$cycloalkyl, —$C(O)C_{2-6}$alkenyl$C_{3-8}$cycloalkyl, —$C(O)C_{2-6}$alkynyl$C_{3-8}$cycloalkyl, —$OC(O)$aryl, —$OC(O)C_{1-6}$alkylaryl, —$C(O)C_{2-6}$alkenylaryl and —$C(O)C_{2-6}$alkynylaryl;

$R_8$ is selected from hydrogen and $C_{1-6}$alkyl; or a pharmaceutically acceptable salt thereof.

In a further aspect of the invention there is provided a method of preventing a biofilm comprising Gram-negative bacteria forming or dispersing a biofilm comprising Gram-negative bacteria on a medical device, said method comprising applying an epoxytiglienone compound of formula (I) to the medical device, the compound of formula (I) being:

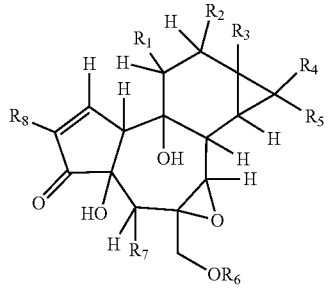

(I)

wherein $R_1$ is selected from hydrogen and $C_{1-6}$alkyl;

$R_2$ is selected from —$OC_{1-8}$alkyl, —$OC_{2-8}$alkenyl, —$OC_{2-8}$alkynyl, —$OC(O)C_{1-7}$alkyl, —$OC(O)C_{2-7}$alkenyl and —$OC(O)C_{2-7}$alkynyl;

$R_3$ is selected from —OH, —$OC_{1-8}$alkyl, —$OC_{2-8}$alkenyl, —$OC_{2-8}$alkynyl, —$OC(O)C_{1-7}$alkyl, —$OC(O)C_{2-7}$alkenyl and —$OC(O)C_{2-7}$alkynyl;

$R_4$ and $R_5$ are independently selected from hydrogen and $C_{1-6}$alkyl;

$R_6$ is selected from hydrogen, —$C_{1-6}$alkyl, —$C_{2-6}$alkenyl, —$C_{2-6}$alkynyl, —$C(O)C_{1-6}$alkyl, —$C(O)C_{2-6}$alkenyl, —$C(O)C_{2-6}$alkynyl, —$C(O)C_{3-8}$cycloalkyl, —$C(O)C_{1-6}$alkyl$C_{3-8}$cycloalkyl, —$C(O)C_{2-6}$alkenyl$C_{3-8}$cycloalkyl, —$C(O)C_{2-6}$alkynyl$C_{3-8}$cycloalkyl, —$C(O)$aryl, —$C(O)C_{1-6}$alkylaryl, —$C(O)C_{2-6}$alkenylaryl and —$OC(O)C_{2-6}$alkynylaryl;

$R_7$ is selected from hydroxy, —$OC_{1-6}$alkyl, —$OC_{2-6}$alkenyl, —$OC_{2-6}$alkynyl, —$OC(O)C_{1-6}$alkyl, —$OC(O)C_{2-6}$alkenyl, —$OC(O)C_{2-6}$alkynyl, —$C(O)C_{3-8}$cycloalkyl, —$C(O)C_{1-6}$alkyl$C_{3-8}$cycloalkyl, —$C(O)C_{2-6}$alkenyl$C_{3-8}$cycloalkyl, —$C(O)C_{2-6}$alkynyl$C_{3-8}$cycloalkyl, —$OC(O)$aryl, —$OC(O)C_{1-6}$alkylaryl, —$C(O)$ $C_{2-6}$alkenylaryl and —$C(O)C_{2-6}$alkynylaryl;

$R_8$ is selected from hydrogen and $C_{1-6}$alkyl; or a pharmaceutically acceptable salt thereof.

DETAILED DESCRIPTION

Definitions

Unless defined otherwise, all technical and scientific terms used herein have the same meaning as commonly understood by those of ordinary skill in the art to which the invention belongs. Although any methods and materials similar or equivalent to those described herein can be used in the practice or testing of the present invention, preferred methods and materials are described. For the purposes of the present invention, the following terms are defined below.

The articles "a" and "an" are used herein to refer to one or to more than one (i.e. to at least one) of the grammatical object of the article. By way of example, "an element" means one element or more than one element.

As used herein, the term "about" refers to a quantity, level, value, dimension, size, or amount that varies by as much as 25%, 20%, 15% or 10% to a reference quantity, level, value, dimension, size, or amount.

Throughout this specification, unless the context requires otherwise, the words "comprise", "comprises" and "comprising" will be understood to imply the inclusion of a stated step or element or group of steps or elements but not the exclusion of any other step or element or group of steps or elements.

The term "alkyl" refers to optionally substituted linear and branched hydrocarbon groups having 1 to 8 carbon atoms. Where appropriate, the alkyl group may have a specified number of carbon atoms, for example, —$C_1$-$C_6$ alkyl which includes alkyl groups having 1, 2, 3, 4, 5 or 6 carbon atoms in linear or branched arrangements.

Non-limiting examples of alkyl groups include methyl, ethyl, propyl, isopropyl, butyl, 2-methylpropyl, 1-methylpropyl, 2,2-dimethylethyl, pentyl, 2-methylbutyl, 3-methylbutyl, 1,2-dimethylpropyl, 2,3-dimethylpropyl, 3,3-dimethylpropyl, hexyl, 1-methylpentyl, 2-methylpentyl, 3-methylpentyl, 4-methylpentyl, 1,1-dimethylbutyl, 1,2-dimethylbutyl, 2,2-dimethylbutyl, 2,3-dimethylbutyl, 3,3-dimethylbutyl, 1-ethylbutyl, 2-ethylbutyl and 3-ethylbutyl, heptyl, 1-methylhexyl, 2-methylhexyl, 3-methylhexyl, 4-methylhexyl, 5-methylhexyl, 1-ethylpentyl, 2-ethylpentyl, 3-ethylpentyl, 1,1-dimethylpentyl, 1,2-dimethylpentyl, 1,3-dimethylpentyl, 1,4-dimethylpentyl, 1,5-dimethylpentyl, 2,3-dimethylpentyl, 2,4-dimethylpentyl, 1,1-dimethylpentyl, 2,2-dimethylpentyl, octyl, 1-methylheptyl, 2-methylheptyl, 3-methylheptyl, 4-methylheptyl, 5-methylheptyl, 1-ethylhexyl, 2-ethylhexyl, 3-ethylhexyl, 1,1-dimethylhexyl, 1,2-dimethylhexyl, 1,3-dimethylhexyl, 1,4-dimethylhexyl, 1,5-dimethylhexyl, 2,3-dimethylhexyl, 2,4-dimethylhexyl, 1,1-dimethylhexyl, 2,2-dimethylhexyl, and the like.

The term "alkenyl" refers to optionally substituted, unsaturated linear or branched hydrocarbons, having 2 to 8 carbon atoms and having at least one double bond. Where appropriate, the alkenyl group may have a specified number of carbon atoms, for example, $C_2$-$C_6$ alkenyl which includes alkenyl groups having 2, 3, 4, 5 or 6 carbon atoms in linear or branched arrangements. Non-limiting examples of alkenyl groups include, ethenyl, propenyl, 1-methylethenyl, butenyl, 1-methylprop-1-enyl, 1-methylprop-1-enyl, 1-ethylethenyl, pentenyl, 1-methylbut-1-enyl, 2-methylbut-1-enyl, 2-methylbut-2-enyl, 1,2-dimethylprop-1-enyl, 1,2-dimethylprop-2-enyl, hexenyl, 1-methylpent-1-enyl, 2-methylpent-1-enyl, 3-methylpent-1-enyl, 1-ethylbut-1-enyl, 2-ethylbut-1-enyl, 1-methylpent-2-enyl, 2-methylpent-2-enyl, 3-methylpent-2-enyl, 4-methylpent-2-enyl, 1-ethylbut-2-enyl, 2-ethylbut-2-enyl, 1,2-dimethylbut-2-enyl, 1,3-dimethylbut-2-enyl, 2,3-dimethylbut-2-enyl, 1-methylpent-3-enyl, 2-methylpent-3-enyl, 3-methylpent-3-enyl, 4-methylpent-3-enyl, 1-ethylbut-3-enyl, 2-ethylbut-3-enyl, 3-ethylbut-3-enyl, 1,2-dimethylbut-3-enyl, 1,3-dimethylbut-3-enyl, 1,1-dimethylbut-3-enyl, 2,3-dimethylbut-3-enyl, 2,2-dimethylbut-3-enyl, hex-1,3-diene, 1-heptenyl, 2-heptenyl, 3-heptenyl, 4-heptenyl, 5-heptenyl, 6-heptenyl, 2,4-heptadienyl, 2,6-heptadienyl, 2,4,6-heptatrienyl, 1-methylhexa-1-enyl, 2-methylhexa-1-enyl, 3-methylhexa-1-enyl, 4-methylhexa-1-enyl, 5-methylhexa-1-enyl, 1-methylhexa-2-enyl, 2-methylhexa-2-enyl, 3-methylhexa-2-enyl, 4-methylhexa-2-enyl, 5-methylhexa-2-enyl, 1-methylhexa-3-enyl, 2-methylhexa-3-enyl, 3-methylhexa-3-enyl, 4-methylhexa-3-enyl, 5-methylhexa-3-enyl, 1-methylhexa-4-enyl, 2-methylhexa-4-enyl, 3-methylhexa-4-enyl, 4-methylhexa-4-enyl, 5-methylhexa-4-enyl, 1-methylhexa-5-enyl, 2-methylhexa-5-enyl, 3-methylhexa-5-enyl, 4-methylhexa-5-enyl, 5-methylhexa-5-enyl, 1-octenyl, 2-octenyl, 3-octenyl, 4-octenyl, 5-octenyl, 6-octenyl, 2,4-octadienyl, 2,6-octadienyl, 2,4,6-octatrienyl, 1-methylhepta-1-enyl, 2-methylhepta-1-enyl, 3-methylhepta-1-enyl, 4-methylhepta-1-enyl, 5-methylhepta-1-enyl, 1-methylhepta-2-enyl, 2-methylhepta-2-enyl, 3-methylhepta-2-enyl, 4-methylhepta-2-enyl, 5-methylhepta-2-enyl, 1-methylhepta-3-enyl, 2-methylhepta-3-enyl, 3-methylhepta-3-enyl, 4-methylhepta-3-enyl, 5-methylhepta-3-enyl, 1-methylhepta-4-enyl, 2-methylhepta-4-enyl, 3-methylhepta-4-enyl, 4-methylhepta-4-enyl, 5-methylhepta-4-enyl, 1-methylhepta-5-enyl, 2-methylhepta-5-enyl, 3-methylhepta-5-enyl, 4-methylhepta-5-enyl, 5-methylhepta-5-enyl and the like.

The term "alkynyl" refers to optionally substituted unsaturated linear or branched hydrocarbons, having 2 to 8 carbon atoms, having at least one triple bond. Where appropriate, the alkynyl group may have a specified number of carbon atoms, for example, $C_2$-$C_6$ alkynyl which includes alkynyl groups having 2, 3, 4, 5 or 6 carbon atoms in linear or branched arrangements. Non-limiting examples include ethynyl, 1-propynyl, 2-propynyl, 1-butynyl, 2-butynyl, 3-butynyl, 1-methylprop-2-ynyl, 1-pentynyl, 2-pentynyl, 3-pentynyl, 4-pentynyl, 1-methylbut-2-ynyl, 1,1-dimethylprop-2-ynyl, 3-methylbut-1-ynyl, 1-hexynyl, 2-hexynyl, 3-hexynyl, 4-hexynyl, 5-hexynyl, 3-methylpent-1-ynyl, 4-methylpent-1-ynyl, 1-methylpent-2-ynyl, 4-methylpent-2-ynyl, 3,3-dimethylbut-1-ynyl, 1,1-dimethylbut-2-ynyl, 1,2-dimethylbut-3-ynyl, 1,1-dimethylbut-3-ynyl, 2,2-dimethylbut-3-ynyl, 1-heptynyl, 2-heptynyl, 3-heptynyl, 4-heptynyl, 5-heptynyl, 6-heptynyl, 3-methylhex-1-ynyl, 4-methylhex-1-ynyl, 1-methylhex-2-ynyl, 4-methylhex-2-ynyl, 3,3-dimethylpent-1-ynyl, 1,1-dimethylpent-2-ynyl, 1,2-dimethylpent-3-ynyl, 1,1-dimethylpent-3-ynyl, 2,2-dimethylpent-3-ynyl, 1-octynyl, 2-octynyl, 3-octynyl, 4-octynyl, 5-octynyl, 6-octynyl, 7-octynyl, 3-methylhept-1-ynyl, 4-methylhept-1-ynyl, 1-methylhept-2-ynyl, 4-methylhept-2-ynyl, 3,3-dimethylhex-1-ynyl, 1,1-dimethylhex-2-ynyl, 1,2-dimethylhex-3-ynyl, 1,1-dimethylhex-3-ynyl, 2,2-dimethylhex-3-ynyl, and the like The terms "cycloalkyl" and "carbocyclic" refer to optionally substituted saturated or unsaturated mono-cyclic hydrocarbon groups. Where appropriate, the cycloalkyl group may have a specified number of carbon atoms, for example, $C_3$-$C_6$ cycloalkyl is a carbocyclic group having 3, 4, 5 or 6 carbon atoms. Non-limiting examples may include cyclopropyl, cyclobutyl, cyclopentyl, cyclopentenyl, cyclohexyl, cyclohexenyl, cyclohexadienyl and the like.

"Aryl" means a $C_6$-$C_{14}$ membered monocyclic, bicyclic or tricyclic carbocyclic ring system having up to 7 atoms in each ring, wherein at least one ring is aromatic. Examples of aryl groups include, but are not limited to, phenyl, naphthyl, tetrahydronaphthyl, indanyl and biphenyl. The aryl may comprise 1-3 benzene rings. If two or more aromatic rings are present, then the rings may be fused together, so that adjacent rings share a common bond.

Each alkyl, alkenyl, alkynyl, cycloalkyl or aryl whether an individual entity or as part of a larger entity may be optionally substituted with one or more optional substituents selected from the group consisting of $C_{1-6}$alkyl, $C_{2-6}$alkenyl, $C_{3-6}$cycloalkyl, oxo (=O), —OH, —SH, $C_{1-6}$alkylO—, $C_{2-6}$alkenylO—, $C_{3-6}$cycloalkylO—, $C_{1-6}$alkylS—, $C_{2-6}$alkenylS—, $C_{3-6}$cycloalkylS—, —$CO_2$H, —$CO_2C_{1-6}$alkyl, —$NH_2$, —NH($C_{1-6}$alkyl), —N($C_{1-6}$alkyl)$_2$, —NH(phenyl), —N(phenyl)$_2$, —CN, —$NO_2$, -halogen, —$CF_3$, —$OCF_3$, —$SCF_3$, —$CHF_2$, —$OCHF_2$, —$SCHF_2$, -phenyl, —$C_{1-6}$alkylphenyl, —Ophenyl, —C(O)phenyl, —C(O)$C_{1-6}$alkyl. Examples of suitable substituents, particularly for the cycloalkyl and aryl groups in $R_6$ and $R_7$, include, but are not limited to, methyl, ethyl, propyl, isopropyl, butyl, sec-butyl, tert-butyl, vinyl, methoxy, ethoxy, propoxy, isopropoxy, butoxy, methylthio, ethylthio, propylthio, isopropylthio, butylthio, hydroxy, hydroxymethyl, hydroxyethyl, hydroxypropyl, hydroxybutyl, fluoro, chloro, bromo, iodo, cyano, nitro, —$CO_2$H, —$CO_2CH_3$, —$C(O)CH_3$, trifluoromethyl, trifluoromethoxy, trifluoromethylthio, difluoromethyl, difluoromethoxy, difluoromethylthio, amino, methylamino, dimethylamino, phenyl, phenoxy, phenylcarbonyl, benzyl and acetyl.

The epoxytiglienone compounds may be in the form of pharmaceutically acceptable salts. It will be appreciated however that non-pharmaceutically acceptable salts also fall within the scope of the invention since these may be useful as intermediates in the preparation of pharmaceutically acceptable salts or may be useful during storage or transport, or may be useful in non-pharmaceutical settings. Suitable pharmaceutically acceptable salts include, but are not limited to, salts of pharmaceutically acceptable inorganic acids such as hydrochloric, sulphuric, phosphoric, nitric, carbonic, boric, sulfamic, and hydrobromic acids, or salts of pharmaceutically acceptable organic acids such as acetic, propionic, butyric, tartaric, maleic, hydroxymaleic, fumaric, maleic, citric, lactic, mucic, gluconic, benzoic, succinic, oxalic, phenylacetic, methanesulphonic, toluenesulphonic, benezenesulphonic, salicyclic sulphanilic, aspartic, glutamic, edetic, stearic, palmitic, oleic, lauric, pantothenic, tannic, ascorbic and valeric acids.

Base salts include, but are not limited to, those formed with pharmaceutically acceptable cations, such as sodium, potassium, lithium, calcium, magnesium, ammonium and alkylammonium.

Basic nitrogen-containing groups may be quarternised with such agents as lower alkyl halide, such as methyl, ethyl, propyl, and butyl chlorides, bromides and iodides; dialkyl sulfates like dimethyl and diethyl sulfate; and others.

It will also be recognised that the epoxytiglienone compounds may possess asymmetric centres and are therefore capable of existing in more than one stereoisomeric form. The invention thus also relates to compounds in substantially pure isomeric form at one or more asymmetric centres e.g., greater than about 90% ee, such as about 95% or 97% ee or greater than 99% ee, as well as mixtures, including racemic mixtures, thereof. Such isomers may be obtained by isolation from natural sources, by asymmetric synthesis, for example using chiral intermediates, or by chiral resolution.

The compounds of the invention may exist as geometrical isomers. The invention also relates to compounds in substantially pure cis (Z) or trans (E) forms or mixtures thereof.

The compounds of the present invention may be obtained by isolation from a plant or plant part, or by derivatisation of the isolated compound, or by derivatisation of a related compound. Isolation procedures and derivatisation procedures may be found in WO 2007/070985 and WO2014/169356.

The term "6,7-epoxytiglienone compound" refers to a compound having the following carbon cyclic structure:

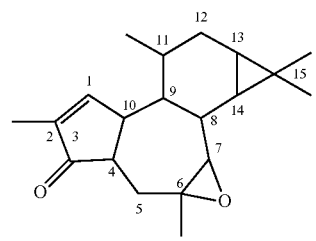

The compounds have a tricyclo[9.3.0.0]tetradecane system with a fused cyclopropane ring appended to the six membered ring. The epoxide is fused to the seven-membered ring in the 6,7-position and the five membered ring has a 1,2-ene-3-one structure.

Methods of the Invention

The present invention provides a method of dispersing a biofilm comprising Gram-negative bacteria, said method comprising exposing the biofilm to an epoxytiglienone compound for formula (I):

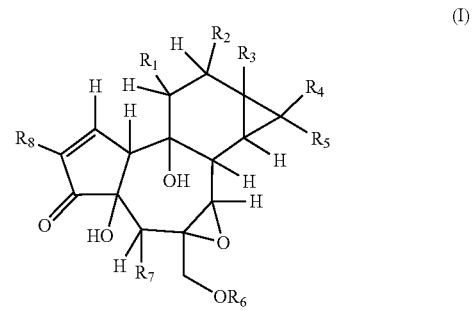

wherein
$R_1$ is selected from hydrogen and $C_{1-6}$alkyl;
$R_2$ is selected from —$OC_{1-8}$alkyl, —$OC_{2-8}$alkenyl, —$OC_{2-8}$alkynyl, —OC(O)$C_{1-7}$alkyl, —OC(O)$C_{2-7}$alkenyl and —OC(O)$C_{2-7}$alkynyl;
$R_3$ is selected from —OH, —$OC_{1-8}$alkyl, —$OC_{2-8}$alkenyl, —$OC_{2-8}$alkynyl, —OC(O)$C_{1-7}$alkyl, —OC(O)$C_{2-7}$alkenyl and —OC(O)$C_{2-7}$alkynyl;
$R_4$ and $R_5$ are independently selected from hydrogen and $C_{1-6}$alkyl;
$R_6$ is selected from hydrogen, —$C_{1-6}$alkyl, —$C_{2-6}$alkenyl, —$C_{2-6}$alkynyl, —C(O)$C_{1-6}$alkyl, —C(O)$C_{2-6}$alkenyl, —C(O)$C_{2-6}$alkynyl, —C(O)$C_{3-8}$cycloalkyl, —C(O)$C_{1-6}$alkyl$C_{3-8}$cycloalkyl, —C(O)$C_{2-6}$alkenyl$C_{3-8}$cycloalkyl, —C(O)$C_{2-6}$alkynyl$C_{3-8}$cycloalkyl, —C(O)aryl, —C(O)$C_{1-6}$alkylaryl, —C(O)$C_{2-6}$alkenylaryl and —OC(O)$C_{2-6}$alkynylaryl;

R₇ is selected from hydroxy, —OC₁₋₆alkyl, —OC₂₋₆alkenyl, —OC₂₋₆alkynyl, —OC(O)C₁₋₆alkyl, —OC(O)C₂₋₆alkenyl, —OC(O)C₂₋₆alkynyl, —C(O)C₃₋₈cycloalkyl, —C(O)C₁₋₆alkylC₃₋₈cycloalkyl, —C(O)C₂₋₆alkenylC₃₋₈cycloalkyl, —C(O)C₂₋₆alkynylC₃₋₈cycloalkyl, —OC(O)aryl, —OC(O)C₁₋₆alkylaryl, —C(O)C₂₋₆alkenylaryl and —C(O)C₂₋₆alkynylaryl;

R₈ is selected from hydrogen and C₁₋₆alkyl; or a salt thereof.

The biofilm comprising the Gram-negative bacteria may be in any situation suitable for treatment. The biofilm may be on an inanimate surface or may be on or in a biological system. In some embodiments, the biofilm is on an inanimate surface, for example, a bench such as a medical, laboratory, food preparation or manufacturing surface such as a surgery bed or floor, a laboratory bench, a kitchen bench or floor, manufacturing equipment for pharmaceuticals, nutraceuticals, cosmetics or personal care products. In some embodiments, the inanimate surface may be a medical device such as medical instruments, surgical instruments, catheters, prostheses and implants. In some embodiments, the biofilm is infecting a subject, for example, a wound such as a surgical wound or a burn. In some embodiments, the biofilm is infecting the subject at the site of the use of a medical device such as a catheter or an implant.

In some embodiments, the biofilm comprises only Gram-negative bacteria. In some embodiments, the biofilm only comprises one species of Gram-negative bacteria. In other embodiments, the biofilm comprises more than one species of Gram-negative bacteria. In some embodiments, the biofilm comprises populations of Gram-negative and Gram-positive bacteria.

The term "dispersing" as used herein means that the biofilm is degraded such that at least a portion of the bacteria are released from the matrix of extracellular polymeric substances (EPS) and assume a planktonic state. Once in a planktonic state, the bacteria are accessible to the immune system and/or to the action of antibiotics.

In some embodiments, the biofilm comprising Gram-negative bacteria comprises one or more Gram-negative bacteria selected from *Pseudomonas* species, *Acinetobacter* species, *Aeromonas* species, *Bacteroides* species, *Bordetella* species, *Borrelia* species, *Burkholderia* species, *Citrobacter* species, *Compylobacter* species, *Escherichia* species, *Enterobacter* species, *Flavobacterium* species, *Fusobacterium* species, *Klebsiella* species, *Leptospira* species, *Neisseria* species, *Helicobacter* species, *Hemophilus* species, *Legionella* species, *Moraxella* species, *Yersinia* species, *Oligella* species, *Pantoea* species, *Porphyromonas* species, *Prevotella* species, *Proteus* species, *Raoutella* species, *Salmonella* species, *Serratia* species, *Shigella* species, *Sphingomonas* species, *Stenotophomonas* species, *Treponema* species, *Veillonella* species and *Vibrio* species, especially *Pseudomonas* species, *Acinetobacter* species, *Escherichia* species, *Klebsiella* species, *Neisseria* species, *Hemophilus* species, *Legionella* species, *Yersinia* species, *Proteus* species and *Salmonella* species, more especially *Pseudomonas* species, *Acinetobacter* species, *Escherichia* species and *Klebsiella* species. In some embodiments, the Gram-negative bacteria are particularly good biofilm forming bacteria and are selected from *Pseudomonas aeruginosa*, *Acinetobacter baumannii*, *Escherichia coli*, *Klebsiella pneumoniae*, *Neisseria gonorrhoeae*, *Neisseria meningitidis*, *Hemophilus influenzae*, *Legionella pneumophila*, *Yersinia pestis*, *Yersinia enterocolitica*, *Salmonella enterica*, *Salmonella bongori*, *Proteus mirabilis*, *Enterobacter cloacae*, *Serratia marcescens*, *Bacteroides fragilis*, *Fusobacterium necrophorum*, *Burkholderia cepacian* and *Prevotella intermedia*, especially *Pseudomonas aeruginosa*, *Acinetobacter baumannii*, *Escherichia coli*, *Klebsiella pneumoniae*, *Neisseria gonorrhoeae*, *Neisseria meningitidis*, *Hemophilus influenzae*, *Legionella pneumophila*, *Yersinia pestis*, *Yersinia enterocolitica*, *Salmonella enterica* and *Salmonella bongori*, more especially *Pseudomonas aeruginosa*, *Acinetobacter baumannii*, *Escherichia coli* and *Klebsiella pneumoniae*.

In another aspect of the invention the biofilm described above dispersed by the method is present in a bacterial infection on or in a subject. Therefore, the invention includes a method of treating a bacterial infection comprising a biofilm comprising Gram-negative bacteria, said method comprising locally administering to the bacterial infection an epoxytiglienone compound of formula (I):

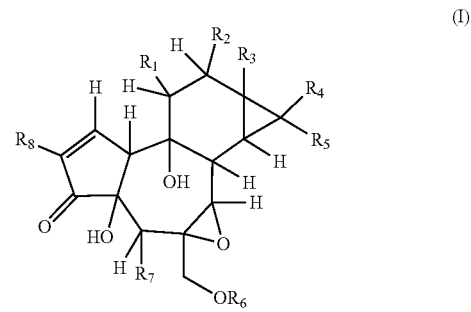

(I)

wherein

R₁ is selected from hydrogen and C₁₋₆alkyl;

R₂ is selected from —OC₁₋₈alkyl, —OC₂₋₈alkenyl, —OC₂₋₈alkynyl, —OC(O)C₁₋₇alkyl, —OC(O)C₂₋₇alkenyl and —OC(O)C₂₋₇alkynyl;

R₃ is selected from —OH, —OC₁₋₈alkyl, —OC₂₋₈alkenyl, —OC₂₋₈alkynyl, —OC(O)C₁₋₇alkyl, —OC(O)C₂₋₇alkenyl and —OC(O)C₂₋₇alkynyl;

R₄ and R₅ are independently selected from hydrogen and C₁₋₆alkyl;

R₆ is selected from hydrogen, —C₁₋₆alkyl, —C₂₋₆alkenyl, —C₂₋₆alkynyl, —C(O)C₁₋₆alkyl, —C(O)C₂₋₆alkenyl, —C(O)C₂₋₆alkynyl, —C(O)C₃₋₈cycloalkyl, —C(O)C₁₋₆alkylC₃₋₈cycloalkyl, —C(O)C₂₋₆alkenylC₃₋₈cycloalkyl, —C(O)C₂₋₆alkynylC₃₋₈cycloalkyl, —C(O)aryl, —C(O)C₁₋₆alkylaryl, —C(O)C₂₋₆alkenylaryl and —OC(O)C₂₋₆alkynylaryl;

R₇ is selected from hydroxy, —OC₁₋₆alkyl, —OC₂₋₆alkenyl, —OC₂₋₆alkynyl, —OC(O)C₁₋₆alkyl, —OC(O)C₂₋₆alkenyl, —OC(O)C₂₋₆alkynyl, —C(O)C₃₋₈cycloalkyl, —C(O)C₁₋₆alkylC₃₋₈cycloalkyl, —C(O)C₂₋₆alkenylC₃₋₈cycloalkyl, —C(O)C₂₋₆alkynylC₃₋₈cycloalkyl, —OC(O)aryl, —OC(O)C₁₋₆alkylaryl, —C(O)C₂₋₆alkenylaryl and —C(O)C₂₋₆alkynylaryl;

R₈ is selected from hydrogen and C₁₋₆alkyl; or a pharmaceutically acceptable salt thereof.

In some embodiments, the infection is an acute infection. In other embodiments, the infection is a chronic infection. In some embodiments, the infection is a post-surgical infection or an infection at the site of insertion or use of a medical device, for example, at the site of insertion of a catheter, such as a venous catheter or a urinary catheter or the site of an implant such as a dental implant or a cochlear implant.

By the term "local administration" is meant that the compound of formula (I) is applied directly to the biofilm. In some embodiments, the local administration will be topical administration such as by use of a lotion, cream, ointment, foam, suspension, liquid wash or spray. In other embodiments, local administration may be achieved during surgery where the infected tissue is exposed, or delivered by injection guided by an imaging technique, for example, guided by endoscopic ultrasound or stereotactic imaging. In particular embodiments, the local administration is to a biofilm containing infection located at a site accessible from outside of the body, for example, on the skin, on an external wound, in the mouth or nose, in the ear or ear canal, around the anus/rectum, the vagina, the urethra or the milk canal of domestic animals.

In some embodiments, the dispersal of the biofilm is accompanied by stimulation of the immune system such that the immune system is able to resolve the infection without the need for antibiotic administration, for example, by stimulating the expression in stromal and dermal cell types of host-defence peptides and of chemokines/cytokines involved in neutrophil/granulocyte recruitment, and by inducing the potent antimicrobial defences of resident and recruited innate immune cells, including release of reactive oxygen species, extracellular nets and broad-spectrum antimicrobial peptides.

In other embodiments, the dispersal of the biofilm is accompanied by co-administration of an antibiotic. In some embodiments, the compound of formula (I) or salt thereof is administered in combination with an antibiotic to which the Gram-negative bacteria is susceptible when in planktonic state. Thus, once the biofilm disperses, the planktonic Gram-negative bacteria are exposed to the antibacterial activity of the antibiotic.

Suitable antibiotics for Gram-negative bacteria include, but are not limited to, $3^{rd}$ generation cephalosporins such as ceftazidime and ceftiofur; $4^{th}$ generation cephalosporins such as cefepime; aminoglycosides such as streptomycin, neomycin, gentamycin, amikacin, tobramycin and plazomicin; monocyclic beta lactams such as aztreonam; beta lactam inhibitor combinations such as piperacillin/tazobactam, amoxicillin/clavulanic acid, cefepime/AAI101, aztreonam/avibactam, ceftaroline/avibactam, imipenem/relebactam and meropenem/RPX7009; beta-lactams such as penicillin, cephalosporin, S649266 and BAL30072; Carbapenems such as imipenem, doripenem, ertapenem and meropenem; polymyxin-E antibiotics such as colistin; quinolones/fluoroquinolones such as ciprofloxacin, fleroxacin, norfloxacin, enrofloxacin, marbofloxacin, finafloxacin, lascufloxacin, avarofloxacin, nadifloxacin, delafloxacin, nemonoxacin and zabofloxacin; sulphonamides such as cotrimoxazole, tetracycline/glycylcyclines such as tigecycline, eravacycline and omadacycline; topoisomerase inhibitors such as ETX0914 and GSK2140944; and other antibiotics such as chloramphenicol and fosfomycin.

By the term "combination" is intended that the compound of formula (I) and the antibiotic are active in the biofilm such that the biofilm is disrupted and the planktonic bacteria exposed to the antibiotic. In some embodiments, the combination of compound of formula (I) and antibiotic are administered in a single composition. In other embodiments, the compound of formula (I) and the antibiotic are administered simultaneously or sequentially in separate compositions.

The subject that has the bacterial infection and may be treated is a mammal, a bird, an aquatic animal such as a fish, or a reptile. In some embodiments, the subject is a human, a laboratory animal such as a primate, mouse, rat or rabbit, a companion animal such as a dog or cat, a working animal such as a horse, donkey and the like, a livestock animal such as a cow, bull, pig, sheep, goat, deer, llama, alpaca and the like, or a captive wild animal such as those in zoos or wildlife parks including lions, leopards, cheetah, elephant, zebra, antelope, giraffe, koala, kangaroo and reptiles such as crocodiles, lizards, snakes and the like, a bird, especially a poultry bird such as a chicken, duck, goose, quail or pheasant, or a captive bird, such as a budgerigar or canary, cockatoo, parakeet, macaw, parrot and the like, or a fish, especially a captive fish such as an aquaculture fish (salmon, trout, barramundi and the like) or tropical fish (zebra fish, guppy, Siamese fighting fish, clown fish, cardinal tetra and the like), dolphins, whales, and the like. In particular embodiments, the subject is a human or a companion animal.

An "effective amount" means an amount necessary at least partly to attain the desired response, such as biofilm dispersement within the infected site. The amount varies depending upon the health and physical condition of the individual to be treated, the taxonomic group of individual to be treated, the formulation of the composition, the assessment of the medical situation, and other relevant factors. It is expected that the effective amount of 6,7-epoxytiglienone compound will fall in a relatively broad range that can be determined through routine trials. An effective amount in relation to a human patient, for example, may lie in the range of about 0.1 ng per kg of body weight to 1 g per kg of body weight per dosage or 0.1 ng to 1 g per $cm^2$ of body surface per dosage. The dosage is preferably in the range of 1 μg to 1 g per kg of body weight per dosage or 1 μg to 1 g per $cm^2$ of body surface area, such as is in the range of 1 mg to 1 g per kg of body weight per dosage, or 1 mg to 1 g per $cm^2$ per body surface area per dosage. In one embodiment, the dosage is in the range of 1 ng to 500 mg per kg of body weight per dosage or 0.1 ng to 500 mg per $cm^2$ of surface area per dosage. In another embodiment, the dosage is in the range of 1 mg to 250 mg per kg of body weight per dosage or 1 mg to 250 mg per $cm^2$ of body surface area per dosage. In yet another embodiment, the dosage is in the range of 1 mg to 100 mg per kg of body weight per dosage or 1 mg to 100 mg per $cm^2$ of body surface area per dosage, such as up to 50 mg per kg of body weight per dosage or 50 mg per $cm^2$ of body surface area per dosage. In yet another embodiment, the dosage is in the range of 1 μg to 1 mg per kg of body weight per dosage or 1 μg to 1 mg per $cm^2$ of body surface area per dosage.

In a further aspect of the invention the biofilm described above dispersed by the method is present or potentially present on a medical device. Therefore, the invention includes a method of preventing a biofilm comprising Gram-negative bacteria forming on a medical device or dispersing a biofilm comprising Gram-negative bacteria on a medical device; said method comprising applying an epoxytiglienone compound of formula (I) to the medical device; the compound of formula (I) being:

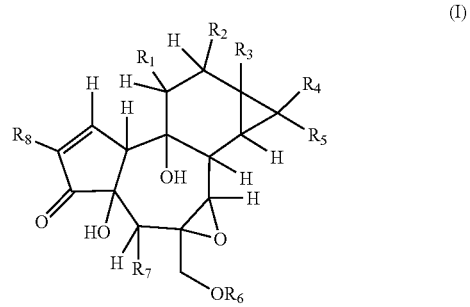

(I)

wherein

R₁ is selected from hydrogen and $C_{1-6}$alkyl; R₂ is selected from —$OC_{1-8}$alkyl, —$OC_{2-8}$alkenyl, —$OC_{2-8}$alkynyl, —$OC(O)C_{1-7}$alkyl, —$OC(O)C_{2-7}$alkenyl and —$OC(O)C_{2-7}$alkynyl;

R₃ is selected from —OH, —$OC_{1-8}$alkyl, —$OC_{2-8}$alkenyl, —$OC_{2-8}$alkynyl, —$OC(O)C_{1-7}$alkyl, —$OC(O)C_{2-7}$alkenyl and —$OC(O)C_{2-7}$alkynyl;

R₄ and R₅ are independently selected from hydrogen and $C_{1-6}$alkyl;

R₆ is selected from hydrogen, —$C_{1-6}$alkyl, —$C_{2-6}$alkenyl, —$C_{2-6}$alkynyl, —$C(O)C_{1-6}$alkyl, —$C(O)C_{2-6}$alkenyl, —$C(O)C_{2-6}$alkynyl, —$C(O)C_{3-8}$cycloalkyl, —$C(O)C_{1-6}$alkyl$C_{3-8}$cycloalkyl, —$C(O)C_{2-6}$alkenyl$C_{3-8}$cycloalkyl, —$C(O)C_{2-6}$alkynyl$C_{3-8}$cycloalkyl, —C(O)aryl, —$C(O)C_{1-6}$alkylaryl, —$C(O)C_{2-6}$alkenylaryl and —$OC(O)C_{2-6}$alkynylaryl;

R₇ is selected from hydroxy, —$OC_{1-6}$alkyl, —$OC_{2-6}$alkenyl, —$OC_{2-6}$alkynyl, —$OC(O)C_{1-6}$alkyl, —$OC(O)C_{2-6}$alkenyl, —$OC(O)C_{2-6}$alkynyl, —$C(O)C_{3-8}$cycloalkyl, —$C(O)C_{1-6}$alkyl$C_{3-8}$cycloalkyl, —$C(O)C_{2-6}$alkenyl$C_{3-8}$cycloalkyl, —$C(O)C_{2-6}$alkynyl$C_{3-8}$cycloalkyl, —OC(O)aryl, —$OC(O)C_{1-6}$alkylaryl, —$C(O)C_{2-6}$alkenylaryl and —$C(O)C_{2-6}$alkynylaryl;

R₈ is selected from hydrogen and $C_{1-6}$alkyl; or a pharmaceutically acceptable salt thereof.

In some embodiments the medical device is coated with a composition comprising compound of formula (I) or a salt thereof to prevent the formation of a biofilm comprising Gram-negative bacteria. In other embodiments, the medical device is washed with or coated with a composition comprising a compound of formula (I) to disperse biofilm comprising Gram-negative bacteria and remove them from the device.

As used herein, the term "medical device" refers to a device that is used on human or animal bodies for therapeutic benefit and has a physical or mechanical effect on the body or is used to measure or monitor functions in the body. Suitable medical devices include indwelling medical devices such as urinary catheters, vascular access devices, endotracheal tubes, tracheostomies, enteral feeding tubes and wound drains; invasive medical devices such as central lines, mechanical heart valves, pacemakers, prosthetic or replacement joints, pins, rods, screws and plates for anchoring fractured bones, catheters such as urinary catheters, venous catheters, Swan-Ganz catheters, Quinton catheters, intrauterine catheters, drainage catheters and pigtail catheters; prosthetics such as limb prosthesis, dental prosthesis including dentures, obturators and dental implants; implants such as cochlear implants coronary stents, contraceptive implants, cosmetic implants and dental implants. Medical devices as used herein also include medical equipment such as syringes, specula, blood pressure monitors, scanners, ultrasound probes and the like; as well as surgical instruments such as scalpels, forceps, clamps, retractors, lancets, endoscopes and calipers.

In some embodiments, the wash or coating comprises an antiseptic, disinfectant or antibiotic.

The invention also relates to a use of compound of formula (I):

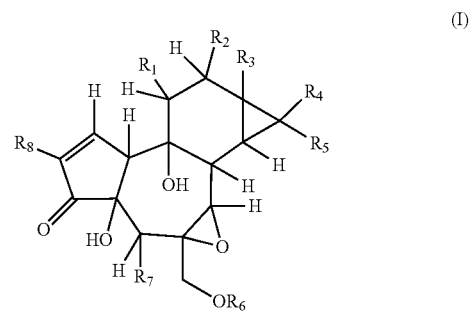

(I)

wherein

R₁ is selected from hydrogen and $C_{1-6}$alkyl;

R₂ is selected from —$OC_{1-8}$alkyl, —$OC_{2-8}$alkenyl, —$OC_{2-8}$alkynyl, —$OC(O)C_{1-7}$alkyl, —$OC(O)C_{2-7}$alkenyl and —$OC(O)C_{2-7}$alkynyl;

R₃ is selected from —OH, —$OC_{1-8}$alkyl, —$OC_{2-8}$alkenyl, —$OC_{2-8}$alkynyl, —$OC(O)C_{1-7}$alkyl, —$OC(O)C_{2-7}$alkenyl and —$OC(O)C_{2-7}$alkynyl;

R₄ and R₅ are independently selected from hydrogen and $C_{1-6}$alkyl;

R₆ is selected from hydrogen, —$C_{1-6}$alkyl, —$C_{2-6}$alkenyl, —$C_{2-6}$alkynyl, —$C(O)C_{1-6}$alkyl, —$C(O)C_{2-6}$alkenyl, —$C(O)C_{2-6}$alkynyl, —$C(O)C_{3-8}$cycloalkyl, —$C(O)C_{1-6}$alkyl$C_{3-8}$cycloalkyl, —$C(O)C_{2-6}$alkenyl$C_{3-8}$cycloalkyl, —$C(O)C_{2-6}$alkynyl$C_{3-8}$cycloalkyl, —C(O)aryl, —$C(O)C_{1-6}$alkylaryl, —$C(O)C_{2-6}$alkenylaryl and —$OC(O)C_{2-6}$alkynylaryl;

R₇ is selected from hydroxy, —$OC_{1-6}$alkyl, —$OC_{2-6}$alkenyl, —$OC_{2-6}$alkynyl, —$OC(O)C_{1-6}$alkyl, —$OC(O)C_{2-6}$alkenyl, —$OC(O)C_{2-6}$alkynyl, —$C(O)C_{3-8}$cycloalkyl, —$C(O)C_{1-6}$alkyl$C_{3-8}$cycloalkyl, —$C(O)C_{2-6}$alkenyl$C_{3-8}$cycloalkyl, —$C(O)C_{2-6}$alkynyl$C_{3-8}$cycloalkyl, —OC(O)aryl, —$OC(O)C_{1-6}$alkylaryl, —$C(O)C_{2-6}$alkenylaryl and —$C(O)C_{2-6}$alkynylaryl;

R₈ is selected from hydrogen and $C_{1-6}$alkyl; or a pharmaceutically acceptable salt thereof; in the manufacture of a medicament for treating a bacterial infection comprising a biofilm comprising Gram-negative bacteria, wherein the medicament is adapted for local administration to the bacterial infection.

In another aspect, the present invention provides a compound of Formula (I) for use in treating a bacterial infection comprising a biofilm comprising Gram-negative bacteria, wherein the compound of formula (I) is:

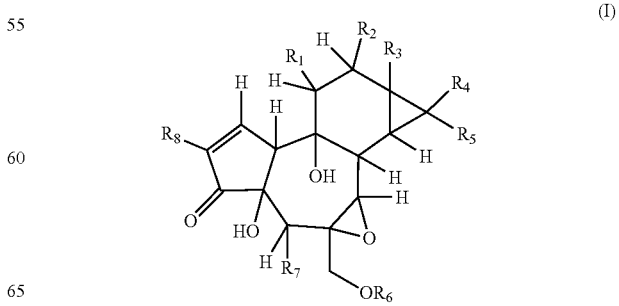

(I)

wherein
R$_1$ is selected from hydrogen and C$_{1-6}$alkyl;
R$_2$ is selected from —OC$_{1-8}$alkyl, —OC$_{2-8}$alkenyl, —OC$_{2-8}$alkynyl, —OC(O)C$_{1-7}$alkyl, —OC(O)C$_{2-7}$alkenyl and —OC(O)C$_{2-7}$alkynyl;
R$_3$ is selected from —OH, —OC$_{1-8}$alkyl, —OC$_{2-8}$alkenyl, —OC$_{2-8}$alkynyl, —OC(O)C$_{1-7}$alkyl, —OC(O)C$_{2-7}$alkenyl and —OC(O)C$_{2-7}$alkynyl;
R$_4$ and R$_5$ are independently selected from hydrogen and C$_{1-6}$alkyl;
R$_6$ is selected from hydrogen, —C$_{1-6}$alkyl, —C$_{2-6}$alkenyl, —C$_{2-6}$alkynyl, —C(O)C$_{1-6}$alkyl, —C(O)C$_{2-6}$alkenyl, —C(O)C$_{2-6}$alkynyl, —C(O)C$_{3-8}$cycloalkyl, —C(O)C$_{1-6}$alkylC$_{3-8}$cycloalkyl, —C(O)C$_{2-6}$alkenylC$_{3-8}$cycloalkyl, —C(O)C$_{2-6}$alkynylC$_{3-8}$cycloalkyl, —C(O)aryl, —C(O)C$_{1-6}$alkylaryl, —C(O)C$_{2-6}$alkenylaryl and —OC(O)C$_{2-6}$alkynylaryl;
R$_7$ is selected from hydroxy, —OC$_{1-6}$alkyl, —OC$_{2-6}$alkenyl, —OC$_{2-6}$alkynyl, —OC(O)C$_{1-6}$alkyl, —OC(O)C$_{2-6}$alkenyl, —OC(O)C$_{2-6}$alkynyl, —C(O)C$_{3-8}$cycloalkyl, —C(O)C$_{1-6}$alkylC$_{3-8}$cycloalkyl, —C(O)C$_{2-6}$alkenylC$_{3-8}$cycloalkyl, —C(O)C$_{2-6}$alkynylC$_{3-8}$cycloalkyl, —OC(O)aryl, —OC(O)C$_{1-6}$alkylaryl, —C(O)C$_{2-6}$alkenylaryl and —C(O)C$_{2-6}$alkynylaryl;
R$_8$ is selected from hydrogen and C$_{1-6}$alkyl; or a pharmaceutically acceptable salt thereof; and the compound is for local administration to the bacterial infection.

6,7-Epoxytiglienone Compounds

The compounds that are useful in the methods of the present invention are compounds of formula (I):

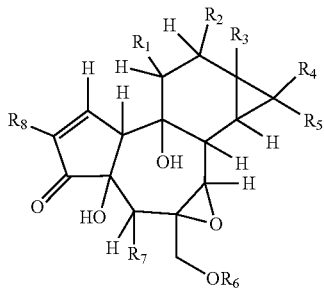

(I)

wherein
R$_1$ is selected from hydrogen and C$_{1-6}$alkyl;
R$_2$ is selected from —OC$_{1-8}$alkyl, —OC$_{2-8}$alkenyl, —OC$_{2-8}$alkynyl, —OC(O)C$_{1-7}$alkyl, —OC(O)C$_{2-7}$alkenyl and —OC(O)C$_{2-7}$alkynyl;
R$_3$ is selected from —OH, —OC$_{1-8}$alkyl, —OC$_{2-8}$alkenyl, —OC$_{2-8}$alkynyl, —OC(O)C$_{1-7}$alkyl, —OC(O)C$_{2-7}$alkenyl and —OC(O)C$_{2-7}$alkynyl;
R$_4$ and R$_5$ are independently selected from hydrogen and C$_{1-6}$alkyl;
R$_6$ is selected from hydrogen, —C$_{1-6}$alkyl, —C$_{2-6}$alkenyl, —C$_{2-6}$alkynyl, —C(O)C$_{1-6}$alkyl, —C(O)C$_{2-6}$alkenyl, —C(O)C$_{2-6}$alkynyl, —C(O)C$_{3-8}$cycloalkyl, —C(O)C$_{1-6}$alkylC$_{3-8}$cycloalkyl, —C(O)C$_{2-6}$alkenylC$_{3-8}$cycloalkyl, —C(O)C$_{2-6}$alkynylC$_{3-8}$cycloalkyl, —C(O)aryl, —C(O)C$_{1-6}$alkylaryl, —C(O)C$_{2-6}$alkenylaryl and —OC(O)C$_{2-6}$alkynylaryl;
R$_7$ is selected from hydroxy, —OC$_{1-6}$alkyl, —OC$_{2-6}$alkenyl, —OC$_{2-6}$alkynyl, —OC(O)C$_{1-6}$alkyl, —OC(O)C$_{2-6}$alkenyl, —OC(O)C$_{2-6}$alkynyl, —C(O)C$_{3-8}$cycloalkyl, —C(O)C$_{1-6}$alkylC$_{3-8}$cycloalkyl, —C(O)C$_{2-6}$alkenylC$_{3-8}$cycloalkyl, —C(O)C$_{2-6}$alkynylC$_{3-8}$cycloalkyl, —OC(O)aryl, —OC(O)C$_{1-6}$alkylaryl, —C(O)C$_{2-6}$alkenylaryl and —C(O)C$_{2-6}$alkynylaryl;
R$_8$ is selected from hydrogen and C$_{1-6}$alkyl; or a salt thereof, especially a pharmaceutically acceptable salt thereof.

In particular embodiments of formula (I), one or more of the following applies:
R$_1$ is selected from —C$_{1-3}$alkyl, especially —CH$_3$;
R$_2$ is selected from —OC(O)C$_{1-7}$alkyl, —OC(O)C$_{2-7}$alkenyl and —OC(O)C$_{2-7}$alkynyl; especially —OC(O)C$_{3-6}$alkyl and —OC(O)C$_{3-6}$alkenyl;
R$_3$ is selected from —OC(O)C$_{1-7}$alkyl, —OC(O)C$_{2-7}$alkenyl and —OC(O)C$_{2-7}$alkynyl; especially —OC(O)C$_{3-6}$alkyl, —OC(O)C$_{3-6}$alkenyl and —OC(O)C$_{3-6}$alkynyl;
R$_4$ and R$_5$ are independently selected from —C$_{1-3}$alkyl; especially where both are methyl;
R$_6$ is selected from hydrogen, —C(O)C$_{1-6}$alkyl, —C(O)C$_{2-6}$alkenyl, —C(O)C$_{2-6}$alkynyl and —C(O)aryl; especially hydrogen, —C(O)CH$_3$, —C(O)CH$_2$CH$_3$, —C(O)CH(CH$_3$)$_2$ and —C(O)CH$_2$CH$_2$CH$_3$;
R$_7$ is selected from hydroxy, —OC(O)C$_{1-6}$alkyl, —OC(O)C$_{2-6}$alkenyl and —OC(O)C$_2$-6alkynyl; especially hydroxyl;
R$_8$ is C$_{1-3}$alkyl, especially methyl.

In some embodiments, the compounds of formula (I) have stereochemistry as shown in formula (II) below:

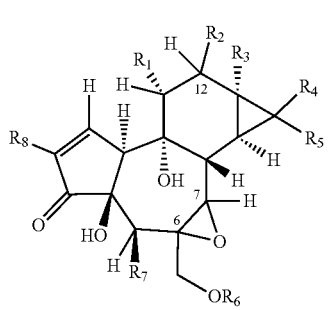

(II)

In some embodiments, the epoxide in the 6,7-position is above the plane of the ring system. In other embodiments, the epoxide in the 6,7-position is below the plane of the ring system. In some embodiments, the R$_2$ group in the 12 position is S and in other embodiments, the R$_2$ group in the 12 position is R.

In some embodiments of formula (I), the alkyl or alkenyl group of R$_2$ and/or R$_3$ are branched alkyl or alkenyl groups. In other embodiments of formula (I), the alkyl or alkenyl group of R$_2$ and/or R$_3$ are linear alkyl or alkenyl groups.

In some embodiments, the alkyl or alkenyl group of R$_2$ and/or R$_3$ has a chain length of intermediate hydrophobicity, for example, C4, C5 or C6.

In some embodiments, R$_6$ is an acyl group, for example an acetyl (—C(O)CH$_3$), —C(O)CH$_2$CH$_3$, —C(O)CH(CH$_3$)$_2$ or —C(O)CH$_2$CH$_2$CH$_3$. In some embodiments, R$_6$ is hydrogen.

In particular embodiments, the epoxytiglienone compound is selected from:
12-tigloyl-13-(2-methylbutanoyl)-6,7-epoxy-4,5,9,12,13,20-hexahydroxy-1-tiglien-3-one (Compound 1);
12,13-di-(2-methylbutanoyl)-6,7-epoxy-4,5,9,12,13,20-hexahydroxy-1-tiglien-3-one (Compound 2);

12-hexanoyl-13-(2-methylbutanoyl)-6,7-epoxy-4,5,9,12,13,
20-hexahydroxy-1-tiglien-3-one (Compound 3);
12,13-dihexanoyl-6,7-epoxy-4,5,9,12,13,20-hexahydroxy-
1-tiglien-3-one (Compound 4);
12-tigloyl-13-(2-methylbutanoyl)-6,7-epoxy-4,5,9,12,13-
pentahydroxy-20-acetyloxy-1-tiglien-3-one (Compound 5);
12-propanoyl-13-(2-methylbutanoyl)-6,7-epoxy-4,5,9,12,
13,20-hexahydroxy-1-tiglien-3-one (Compound 6);
12,13-ditigloyl-6,7-epoxy-4,5,9,12,13,20-hexahydroxy-1-
tiglien-3-one (Compound 7);
12-(2-methylbutanoyl)-13-tigloyl-6,7-epoxy-4,5,9,12,13,
20-hexahydroxy-1-tiglien-3-one (Compound 8);
12-butanoyl-13-(2-methylbutanoyl)-6,7-epoxy-4,5,9,12,13,
20-hexahydroxy-1-tiglien-3-one (Compound 9);
12-(3,3-dimethylbut-2-enoyl)-13-(2-methylbutanoyl)-6,7-
epoxy-4,5,9,12,13,20-hexahydroxy-1-tiglien-3-one (Compound 10);
12-hex-2,4-dienoyl-13-(2-methylbutanoyl)-6,7-epoxy-4,5,
9,12,13,20-hexahydroxy-1-tiglien-3-one (Compound 11);
12-tigloyl-13-(2-methylpropanoyl)-6,7-epoxy-4,5,9,12,13,
20-hexahydroxy-1-tiglien-3-one (Compound 12);
12-but-2-enoyl-13-(2-methylbutanoyl)-6,7-epoxy-4,5,9,12,
13,20-hexahydroxy-1-tiglien-3-one (Compound 13);
12-tigloyl-13-butanoyl-6,7-epoxy-4,5,9,12,13,20-hexahy-
droxy-1-tiglien-3-one (Compound 14);
12,13-dibutanoyl-6,7-epoxy-4,5,9,12,13,20-hexahydroxy-
1-tiglien-3-one (Compound 15);
12,13-dipentanoyl-6,7-epoxy-4,5,9,12,13,20-hexahydroxy-
1-tiglien-3-one (Compound 16);
12,13-di-(2E,4E)-hexa-2,4-dienoyl-6,7-epoxy-4,5,9,12,13,
20-hexahydroxy-1-tiglien-3-one (Compound 17);
12,13-di-(2-methylbutanoyl)-6,7-epoxy-4,5,9,12,13,20-
hexahydroxy-1-tiglien-3-one (Compound 18);
12-(2-methylprop-2-enoyl)-13-(2-methylbutanoyl)-6,7-ep-
oxy-4,5,9,12,13,20-hexahydroxy-1-tigliaen-3-one (Compound 19);
12,13-di-heptanoyl-6,7-epoxy-4,5,9,12,13,20-hexahydroxy-
1-tigliaen-3-one (Compound 20);
12,13-di-(3-methylbutanoyl)-6,7-epoxy-4,5,9,12,13,20-
hexahydroxy-1-tigliaen-3-one (Compound 21);
or a salt thereof, especially pharmaceutically acceptable salts thereof.

In particular embodiments, the 6,7-epoxytiglienone compound is selected from compounds 1, 2, 3, 4 and 6.

The epoxytiglienone compounds may be obtained by extraction or may be obtained semisynthetically from extracted compounds. Methods for obtaining the epoxytiglienone compounds are provided in WO2007/070985 and WO2014/169356, the contents of which are incorporated by reference.

Compositions

While the 6,7-epoxytiglienone compounds or salts thereof may be used neat, it may be more convenient to use them in the form of a composition, together with a carrier, diluent and/or excipient. In some embodiments, the composition may be a solution useful to soak medical devices. In other embodiments, the composition may be a coating composition useful to coat medical devices. In yet other embodiments, the composition may be a pharmaceutical composition suitable for administration to a patient.

Dosage form and rates for pharmaceutical use and compositions are readily determinable by a person of skill in the art.

The 6,7-epoxytiglienone compound is formulated for localized administration directly onto or into the biofilm. In some embodiments, the 6,7-epoxytiglienone compound is formulated for topical administration in the form of a gel, ointment, lotion, cream or transdermal patch that may be applied directly onto the biofilm. In other embodiments, the epoxytiglianone compound is formulated for injection, for example, where the composition is injected internally to locally contact the biofilm.

In some embodiments, suitably, the composition is a pharmaceutical composition(s) and comprises a pharmaceutically acceptable excipient or an acceptable excipient. By "pharmaceutically acceptable excipient" is meant a solid or liquid filler, diluent or encapsulating substance that may be safely used. Depending upon the particular route of administration, a variety of carriers, well known in the art may be used. These carriers or excipients may be selected from a group including sugars, starches, cellulose and its derivatives, cyclodextrins, malt, gelatine or other gelling agents, polymers, talc, calcium sulphate, vegetable oils, synthetic oils, alcohols and/or polyols, alginic acid, phosphate buffered solutions, emulsifiers, isotonic saline, and pyrogen-free water.

Liquid form preparations include solutions, suspensions, and emulsions, for example, water or water-propylene glycol solutions. For example, injectable liquid preparations can be formulated as solutions in aqueous 1,2-propanediol, dimethylsulfoxide (DMSO), aqueous solutions of gamma cyclodextrin or 2-hydroxypropyl-beta-cyclodextrin, saline solution or polyethylene glycol solution, with or without buffer. A preferred range of pH is 3.0-4.5. Suitable buffers buffer the preparation at pH 3.5-4.5 and include, but are not limited to, acetate buffer and citrate buffer.

The compositions of 6,7-epoxytiglienone compound may thus be formulated administration (e.g. by injection, for example bolus injection at the site of a biofilm infection) and may be presented in unit dose form in ampoules, pre-filled syringes, small volume infusion or in multi-dose containers with an added preservative. The compositions may take such forms as suspensions, solutions, gels or emulsions in oily or aqueous vehicles, and may contain formulatory agents such as suspending, stabilising and/or dispersing agents. Alternatively, the active ingredient may be in powder form, obtained by aseptic isolation of sterile solid or by lyophilisation from solution, for constitution with a suitable vehicle, e.g. sterile, pyrogen-free water, before use.

Pharmaceutical compositions of 6,7-epoxytiglienone compound suitable for administration may be presented in discrete units such as syringes, vials, tubes or sachets each containing a predetermined amount of one or more pharmaceutically active 6,7-epoxytiglienone compounds, as a powder or granules or as a solution or a suspension in an aqueous liquid, a cyclodextrin solution, a non-aqueous liquid, an oil-in-water emulsion or a water-in-oil emulsion or as a solution or suspension in a cream or gel or as a suspension of micro- or nano-particles incorporating a 6,7-epoxytiglienone compound, including but not limited to silica or polylactide micro- or nano-particles. Such compositions may be prepared by any of the methods of pharmacy but all methods include the step of bringing into association one or more pharmaceutically active compounds of the invention with the carrier which constitutes one or more necessary ingredients. In general, the compositions are prepared by uniformly and intimately admixing the agents of the invention with liquid carriers or finely divided solid carriers or both, and then, if necessary, shaping the product in to the desired presentation.

For topical administration to the epidermis or other organ, the compounds according to the invention may be formulated as gels, ointments, emulsions, pastes, creams or lotions, or as a transdermal patch. Gels may be prepared using suitable thickening agents and adding them to aqueous/alcoholic compositions of compound. Suitable thickening or gelling agents are known in the art, such as the polyvinyl carboxy polymer Carbomer 940. Ointments and creams may, for example, be formulated with an aqueous or oily base with the addition of suitable thickening and/or gelling agents.

Lotions may be formulated with an aqueous or oily base and will in general also contain one or more emulsifying agents, stabilising agents, dispersing agents, suspending agents, thickening agents, or colouring agents.

Formulations suitable for topical administration also include solutions or suspensions that may be administered topically in the form of a bath or soak solution or a spray or may be absorbed into a dressing.

Liquid formulations suitable for soaking or washing medical devices may also include solutions or suspensions in solvents such as water and alcohols or mixtures thereof. The solutions or suspensions may also contain other components such as emulsifiers, surfactants, antiseptics, disinfectants, antibiotics, colouring agents and the like.

Coatings are suitably polymeric coatings known in the art that may incorporate a compound of formula (I) such that it is accessible at the surface of the coating and is sufficient to prevent a biofilm comprising Gram-negative bacteria forming. Suitable coatings include hydroxyapatite, calcium phosphate, biophosphonates, bioactive ceramics, polyhydroxyalkanoates, mesoporous materials, hydrogels and drug-eluting coatings such as polymer coatings, calcium phosphate, chitosan, collagen and bone grafts/cancellous bone.

BRIEF DESCRIPTION OF THE FIGURES

FIG. 5 provides A: the CLSM images when Compounds 1, 4, 6 and the comparator compound CC-1 are applied to biofilms of *A. baumannii* 7789 compared to an untreated and ethanol equivalent (blank) control. Upper panel in each image is overhead view, small lower panel is cross-sectional view. B: the CLSM images when compounds 1, 4, 6 and the comparator compound CC-1 are applied to biofilms of *P. aeruginosa* PAO1 compared to an untreated and ethanol equivalent (blank) control. Upper panel in each image is overhead view, small lower panel is cross-sectional view.

FIG. 6 provides A: biofilm biomass volume or bio-volume ($\mu m^3/\mu m^2$) that was quantified and confirmed with COMSTAT image analysis after treatment of the *A. baumannii* 7789 biofilms with Compounds 1, 4, 6 and the comparator compound CC-1 compared to the untreated and ethanol equivalent (blank) controls. Significant decreases in bio-volume were evident in biofilms treated with compounds 1, 4 and comparator compound CC-1 ($p<0.05$). B: biofilm biomass volume or bio-volume ($\mu m^3/\mu m^2$) that was quantified and confirmed with COMSTAT image analysis after treatment of the *P. aeruginosa* PAO1 biofilms with Compounds 1, 4, 6 and the comparator compound CC-1 compared to the untreated and ethanol equivalent (blank) controls. Only Compound 4 had a significant effect on biofilm bio-volume compared to other treatments ($P<0.05$). C & D: there were no significant differences in the DEAD/LIVE bacterial ratio, that was quantified and confirmed with COMSTAT image analysis, after treatment of the *A. baumannii* 7789 and *P. aeruginosa* PAO1 biofilms with Compounds 1, 4, 6 and the comparator compound CC-1 compared to the untreated and ethanol equivalent (blank) controls.

EXAMPLES

Figure 1:
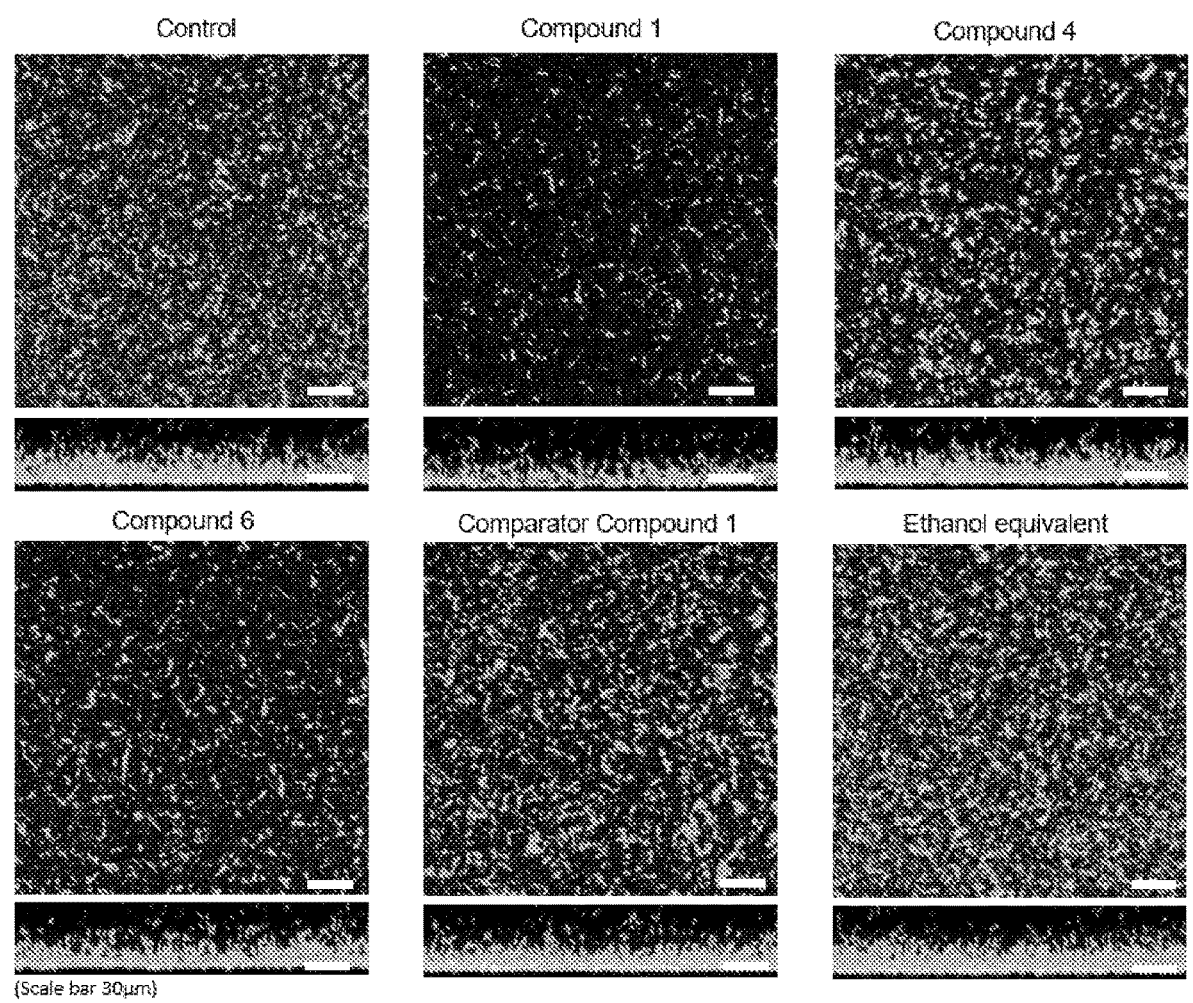
FIG. 1 provides confocal laser scanning microscopy (CLSM) images showing biofilm disruption of *E. coli* IR57 following treatment with Compounds 1, 4 and 6 compared to the comparator compound CC-1, untreated and ethanol equivalent (blank) controls. Upper panel in each image group is overhead view, small lower panel is cross-sectional view.

The compounds of the present invention may be obtained by isolation from a plant or plant part, or by derivatisation of the isolated compound, or by derivatisation of a related compound. Isolation procedures and derivatisation procedures may be found in WO 2007/070985 and WO2014/169356.

Example 1: Epoxy-Tigilanes have No Direct Antibiotic Activity Against Gram-Negative Bacteria in Planktonic Culture Systems The effects of five epoxytiglienones (Compounds 1, 2, 3, 4 and 6) and two comparator comparator compounds (epoxytiglienones having longer carbon chains at the $C_{12}$ position) on six human pathogenic bacteria (two Gram-positive and four Gram-negative species) were measured in conventional planktonic culture systems. A minimum inhibitory concentrations (MIC) assay (the standard assay employed to define and quantify antibiotic activity) was performed to determine antibacterial activity for each epoxytiglienone against each bacterial strain.

The Gram-positive bacteria used in this study were methicillin resistant *Staphylococcus aureus* (MRSA) 1004A and *Streptococcus pyogenes*. The Gram-negative bacteria used in this study were *Pseudomonas aeruginosa* PAO1, *Escherichia coli* IR57 (V7), *Klebsiella pneumoniae*, and *Acinetobacter baumannii* 7789 (V19). MIC assays were performed on planktonic cultures of each bacteria grown in Mueller-Hinton broth using the standard broth dilution method described by Jorgensen et al. (1999) using epoxytiglienones dissolved in ethanol. The results are shown in Table 1 below.

TABLE 1

Minimum inhibitory concentrations (μg/mL) determined for Compounds 1, 2, 3, 4 and 6 and comparator compounds CC-1 and CC-2 against two Gram-positive bacteria and four Gram-negative bacteria. C = confluent growth, i.e. no MIC could be determined at any concentration tested. Data presented represent the mean of three replicate tests.

| Bacteria | Compound number | | | | | Comparator* | |
|---|---|---|---|---|---|---|---|
| | 1 | 2 | 3 | 4 | 6 | CC-1 | CC-2 |
| Gram-positive species | | | | | | | |
| S. aureus | 256 | 256 | 256 | 512 | C | 8 | 16 |
| S. pyogenes | 128 | 128 | 128 | 256 | C | 8 | 8 |
| Gram-negative species | | | | | | | |
| E. coli | C | C | C | C | C | C | C |
| P. aeruginosa | C | C | C | C | C | C | C |
| K. pneumoniae | C | C | C | C | C | C | C |
| A. baumannii | C | C | C | C | C | C | C |

*Comparator compounds are epoxytiglienones having longer carbon chains at the C12 position. CC-1 is 12-(2,4-decadienoyl)-13-(2-methylbutanoyl)-6,7-epoxy-4,5,9,12,13,20-hexahydroxy-1-tiglien-3-one and CC-2 12R-(2,4-decadienoyl)-13R-(2-methylbutanoyl)-6,7-epoxy-4R,5R,9S,12R,13R,20-hexahydroxy-1-tiglien-3-one.

The results demonstrated that the direct antimicrobial properties of the epoxytiglienones in planktonic culture were restricted to the Gram-positive bacteria. No MIC value could be determined for any of the compounds with any of the Gram-negative bacteria tested, all of which were unaffected (with confluent growth of bacteria at concentrations of the test compounds exceeding 512 μg/mL).

Example 2: Epoxytiglienones Disrupt Established Biofilm of Gram-Negative *E. coli*

The effects of administration of Compounds 1, 4 and 6 and comparator compound CC-1 on disruption of established in vitro biofilms of *Escherichia coli* (*E. coli*) was investigated using methods described in Powell et al. (2018).

Biofilms of *E. coli* IR57 were grown on 96-well glass-bottomed plates in Mueller-Hinton (MH) broth for 24 h, before 50% of the supernatant was replaced with fresh MH broth with or without the epoxytiglienone compound added to a final concentration of 256 μg/mL (vehicle is ethanol). An ethanol equivalent blank was used as a further control treatment. The plates were then incubated for a further 24 h at 37° C.

Confocal laser scanning microscopy (CLSM) was then used to image the biofilms, following staining with Live/Dead® Baclight stain with phosphate buffered saline (PBS) added to each well before imaging with z-stack CLSM. The resultant images were analysed by COMSTAT software to produce measurements of (i) biofilm biomass volume or bio-volume ($\mu m^3/\mu m^2$) and (ii) DEAD/LIVE bacterial ratio.

Figure 2A:
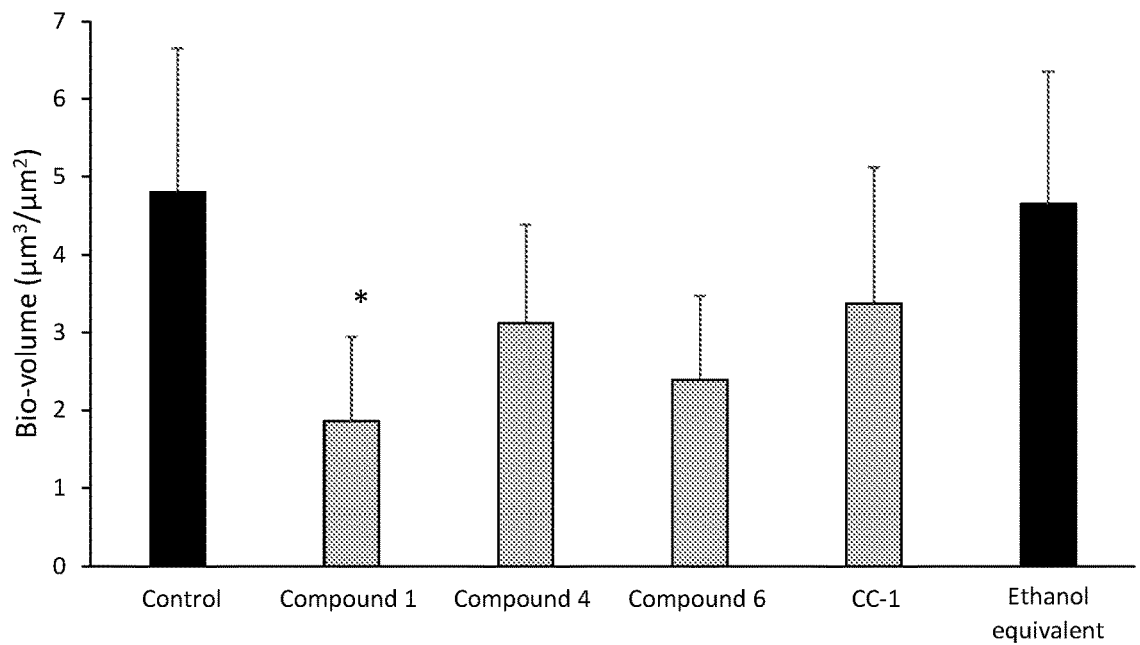
FIG. 2 provides A: biofilm biomass volume or bio-volume ($\mu m^3/\mu m^2$) that was quantified and confirmed with COMSTAT image analysis after treatment of the *E. coli* IR57 biofilm with Compounds 1, 4 and 6, compared to the comparator compound CC-1, untreated and ethanol equivalent (blank) controls. Decreases in bio-volume were evident in biofilms treated with these compounds, which were significant with Compound 1 treatment ($p<0.05$). B: there was no significant differences between any of the compounds and control treatments in the DEAD/LIVE bacterial ratio, demonstrating disruption to the *E. coli* IR57 biofilm density and bio-volume in these experiments was not related to a direct antibiotic activity.
Figure 2B:
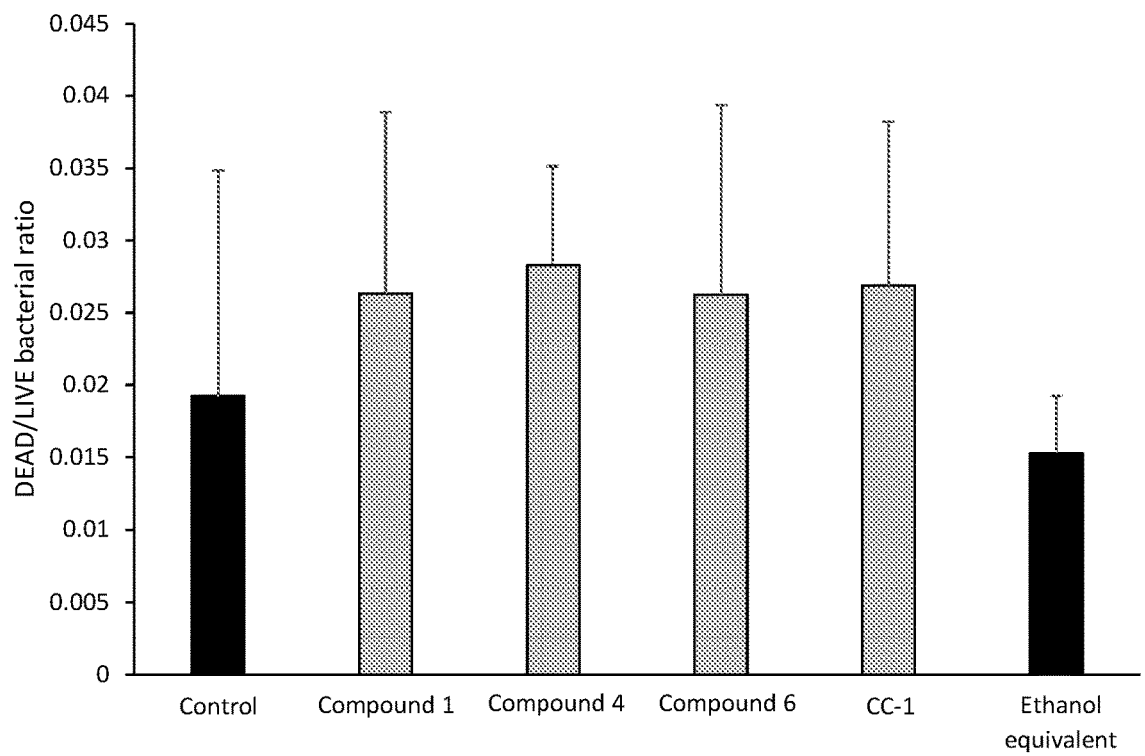

CLSM demonstrated marked differences between treatments in the distribution of the bacteria in the biofilms. Compounds 1, 4 and 6 induced significant changes the distribution and density of bacteria in the biofilm compared to the untreated and ethanol equivalent (blank) controls (FIG. 1); this was quantified and confirmed with COMSTAT image analysis. Significant decreases in bio-volume were evident in biofilms treated with Compound 1 ($p<0.05$; FIG. 2A). The comparator compound CC-1 had no apparent effect on biofilm distribution and density or bio-volume. Interestingly, there were no significant differences between any of the epoxytiglienones and the two control treatments in the DEAD/LIVE bacterial ratios (FIG. 2B), demonstrating the effect of the epoxytiglienones on biofilm density and bio-volume in these experiments was unrelated to direct antibiotic activity.

Example 3: Epoxytiglienones Disrupt the Extracellular Matrix and Increase Particle Diffusion Through an Established Biofilm of the Gram-Negative *E. coli* Bacteria The effect of three epoxytiglienones (Compounds 1, 4 and 6) on the assembly and permeability of established biofilms of *E. coli* was assessed using multiple particle tracking (MPT). MPT is a recently described technique, allowing simultaneous tracking of micron-size particles through biofilms using microscopy, from which the diffusion-based parameters of embedded particles within the extracellular polymeric matrix (EPS) of the biofilm can be determined (Cao et al. 2016). MPT measurements also allows for calculation of micro-rheological properties of the biofilm structure following treatment with test compounds.

*E. coli* biofilms were established and epoxytiglienone and control treatments applied as described in Example 2 above. Twenty-four hours after application of the treatments, the biofilms were stained with SYTO9® and 0.0025% of negatively-charged, carboxylate-modified FluoSpheres® (200 nm) added onto the biofilms and incubated for a further 2 hours. FluoSphere® particle movements within the biofilms were then captured on video using epifluorescence microscopy with a high frame-rate camera (33 ms). Particle trajectories were tracked using ImageJ softwaren (Mosaic) before calculation of three parameters of the 200 nm FluoSphere® particles: (i) ensemble diffusion coefficient (Deff), (ii) ensemble mean squared displacement (MSD) and (iii) creep compliance (a measure of resistance to mechanical deformation derived from the MSD vs lag time). Each treatment was replicated three times.

All three epoxytiglienone compounds that were tested increased particle diffusion through the established *E. coli* biofilms by between 80 and 420 times compared to the control treatments (Table 2).

TABLE 2

Diffusion coefficients for 200 nm negatively-charged, carboxylate-modified FluoSpheres ® particles in *E. coli* IR57 biofilms treated with epoxytiglienones.

| Compounds | Diffusion coefficient (Deff) ($cm^2 \cdot s^{-1} \times 10^{-9}$) ± standard deviation |
|---|---|
| Compound 4 | 0.8449 ± 0.1250 |
| Compound 1 | 0.6018 ± 0.0901 |
| Compound 6 | 0.1607 ± 0.0104 |
| No treatment controls | 0.002 ± 0.0014 |
| Ethanol only control | 0.0155 ± 0.0052 |

Figure 3:
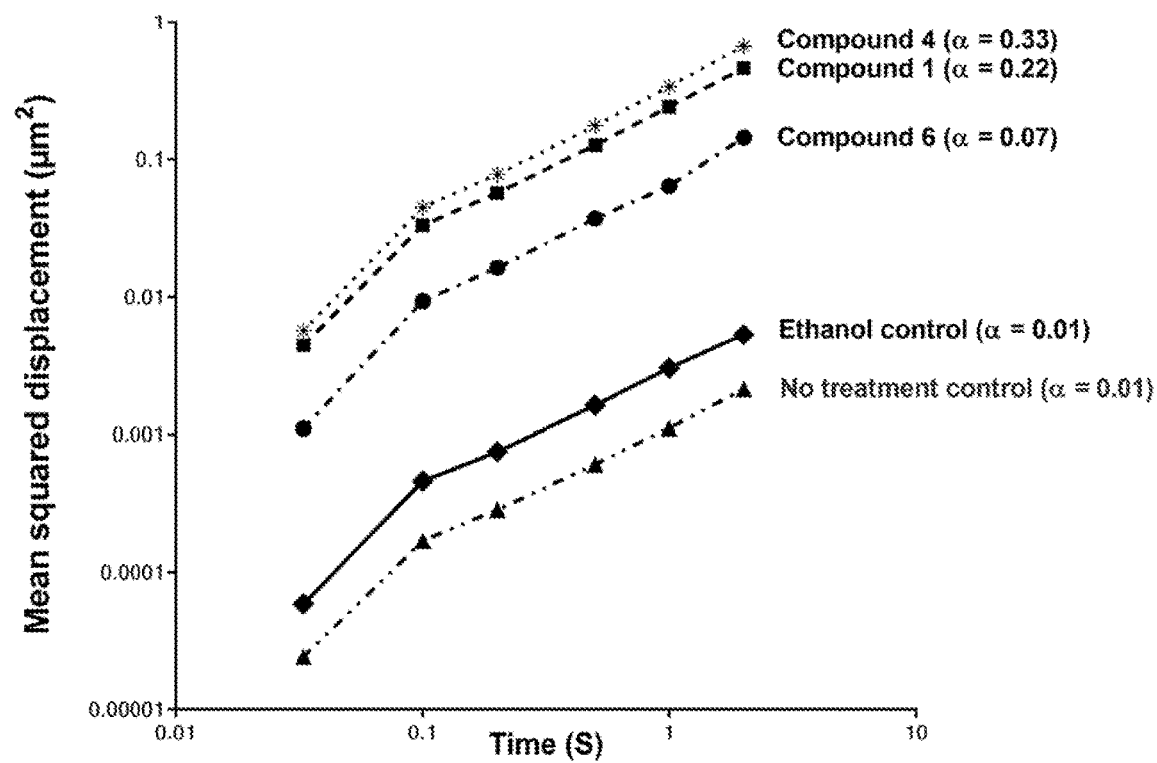
FIG. 3 provides a graph of the mean squared displacement (MSD) of 200 nm FluoSpheres® over time (in seconds) within *E. coli* IR57 biofilm structures. The disruption and alteration of the *E. coli* IR57 biofilm structure is illustrated by substantially higher mean squared displacement of the FluoSphere® particles following treatment with Compounds 1, 4 and 6, compared with an untreated and ethanol equivalent (blank) controls.
Figure 4:
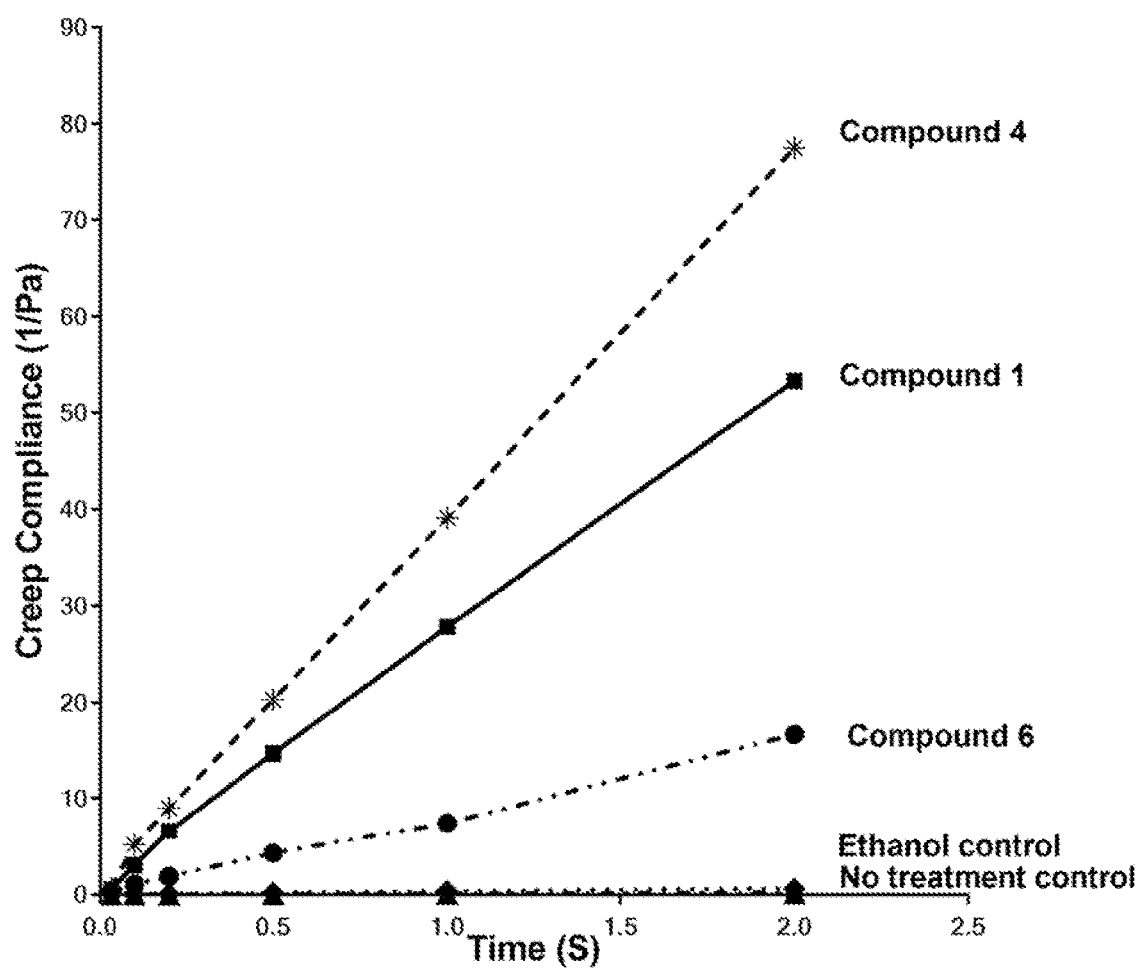
FIG. 4 provides a graph of increased biofilm creep compliance (demonstrating) decreased resistance to mechanical deformation of the biofilm medium derived from the MSD vs lag time as seen in FIG. 3) following treatment *E. coli* IR57 biofilm with Compounds 1, 4 and 6, compared to the untreated and ethanol equivalent (blank) controls.

Significant disruption and alteration to the structure of the *E. coli* biofilm matrix by the epoxytiglienones were illustrated by substantially higher mean squared displacement values of the FluoSphere® particles following treatment (FIG. 3) and decreased resistance to mechanical deformation in the treated biofilms was evident in the increase of the creep compliance of the epoxytiglienone treated biofilms versus controls (FIG. 4).

Example 4: Epoxytiglienones Significantly Decrease Biomass in Established Biofilms of Two Other Gram-Negative Pathogens *P. aeruginosa* and *A. baumannii*

The effects of the epoxytiglienones (Compounds 1, 4, 6 and the comparator compound CC-1) on disruption of established in vitro biofilms were further investigated with two other species of Gram-negative bacteria (*Pseudomonas aeruginosa* PA01 and *Acinetobacter baumannii* 7789) using methods described in Example 2 above. Cell permeabilisation following Compound 1, 4 and 6 treatment was also determined using SYTOX™ Green Nucleic Acid Stain with untreated control and positive control of 70% isopropanol.

Figure 7:
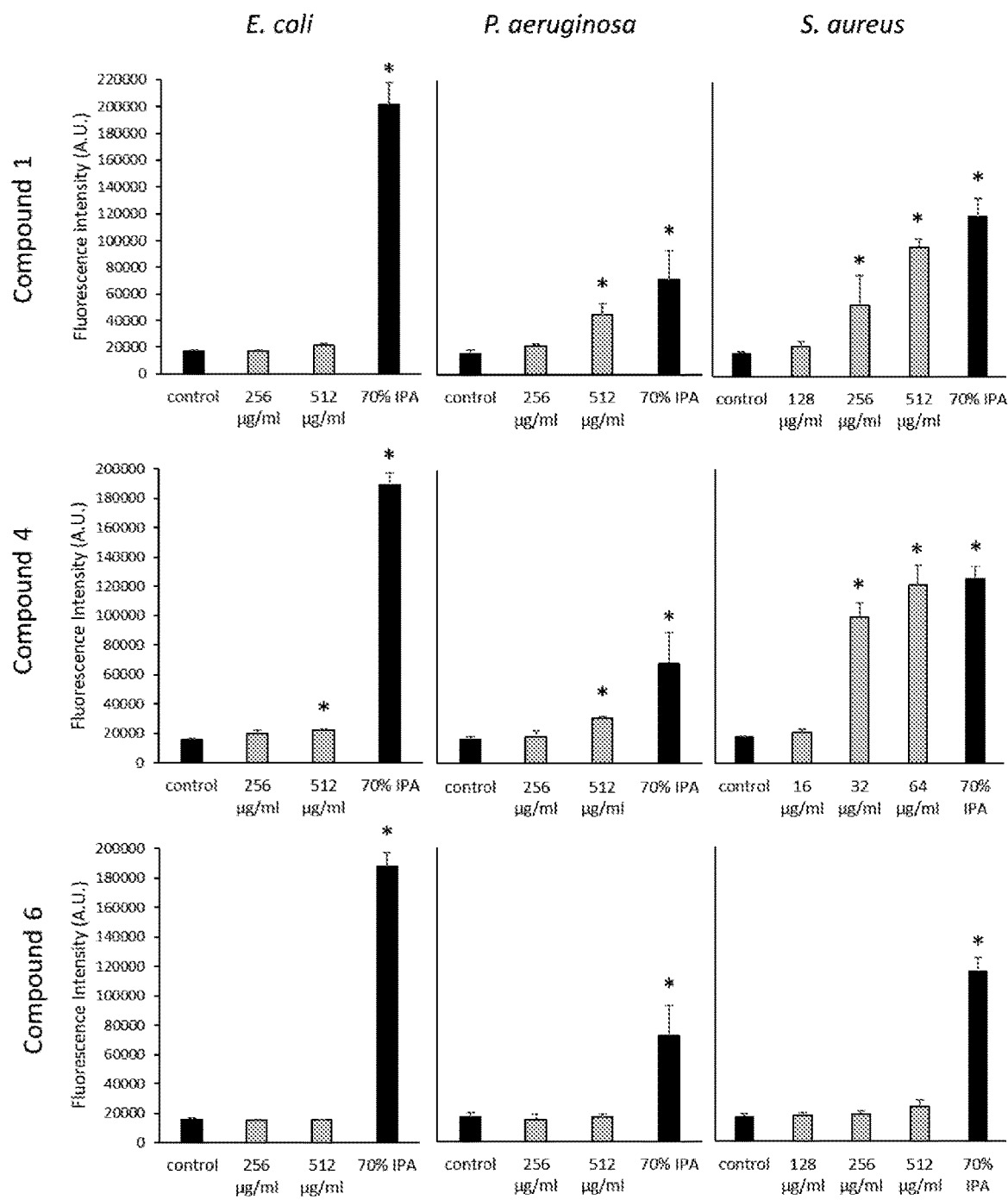
FIG. 7 provides cell membrane permeabilization data when Compounds 1, 4 and 6 were applied to planktonic cells of *E. coli* IR57, *P. aeruginosa* PAO1 and *S. aureus* (1004A; MRSA) compared to the untreated control and positive control of 70% Isopropanol. The Gram-negative strains (*E. coli* IR57 and *P. aeruginosa* PAO1) only showed significant increases in cell permeabilization when treated with compounds 1 and 4 at concentration ≥512 µg/mL unlike the Gram-positive strain (MRSA 1004A) which demonstrated significant cell permeabilization at concentrations as low as 32 µg/mL.

Consistent with the results of the *E. coli* study, the epoxytiglienone compounds significantly changed the distribution and density of bacteria in the *A. baumannii* biofilms compared to the untreated and ethanol equivalent (blank) controls (FIG. 5A). This was also reflected in their effects as measured by bio-volume for *A. baumannii* biofilms (FIG. 6A), where significant reductions were seen for Compounds 1, 4 and CC-1. For *P. aeruginosa* only Compound 4 had a significant effect on biofilm distribution (FIG. 5B) and on bio-volume compared to other treatments (FIG. 6B). DEAD/LIVE bacterial ratios were also assessed and, as in Example 2 with *E. coli*, there were no differences between treatments in either *A. baumannii* or *P. aeruginosa* (FIGS. 6C & D). Cell permeabilization studies on *E. coli* and *P. aeruginosa* bacteria (FIG. 7) only showed significant increases in permeabilization when treated with Compounds 1 and 4 at concentrations ≥512 µg/mL, which is greater than the compound concentration used in the biofilm disruption assays (256 µg/mL). This further confirms that the effects of the epoxytiglienones on biofilm density and bio-volume in these experiments was unrelated to any direct, antibiotic activity in killing bacteria within the biofilms.

Example 5: Epoxytiglienones Resolve Established Biofilm In Vivo in a Mouse Model of Chronic Biofilm Infection The effects of administration of Compound 4 on biofilm infection in vivo was studied in a diabetic murine model of chronic biofilm infection (Zhao et al. 2010). In this study we used methods described by Dhall et al. (2014) in which bacterial biofilm infections develop spontaneously following wound creation.

Briefly, db/db diabetic mice (>6 months old) were housed for 4-5 weeks in non-sterile conditions prior to the creation of wound on the back of each mouse with a 6 mm diameter excisional punch biopsy. Mice were then administered a catalase inhibitor intra-peritoneally (1 g/kg aminotriazole) and a glutathione peroxidase (GPx) inhibitor topically around the edge of the wound site (1 g/kg mercaptosuccinic acid) prior to dressing with Tegaderm. After 24 h, biofilms were evident at the wound site on all mice. The mice where divided into two groups (7 mice per group) and treated with either Compound 4 (0.3 mg/mL in a hydrogel vehicle) or a Control treatment (hydrogel vehicle only). The Tegaderm dressing was the then replaced. Two further administrations of Compound 4 or the Control (vehicle only) were performed at 8 and 15 days. No antibiotics or other antibacterial treatments were applied during the study.

The presence of biofilm and the surface area of the wound were assessed over the course of the study. Biopsies were taken from Compound 4-treated and vehicle-only (control) treated mice between day 21 and 28 post wounding, for histological and histochemical analysis of the wound site. Only 1 of the 7 wounds in the Control group healed within this period, with the presence of a fibrinous slough and bacterial infiltration of the wound site clearly evident. In epoxytiglienone-treated infected wounds, complete wound healing was evident (with complete re-epithelialisation, resolution of inflammation and an absence of bacteria within the dermis) in 6 of the 7 mice treated with Compound 4.

Example 6: Epoxytiglienone Treatment of Human Adult Keratinocytes and Fibroblasts In Vitro Induces Upregulation of Chemokines/Cytokines Involved in Neutrophil Recruitment In addition to disrupting the structure of biofilms comprising Gram-negative bacteria, effects of epoxytiglienones on regulation of genes involved in host response to bacterial infection were investigated in microarray studies with human adult epidermal keratinocytes (HEKa) and human adult dermal fibroblasts (HDF) in vitro.

For these studies, HEKa were cultured in EpiLife® Medium supplemented with Supplement S7 (both from Life Technologies, Carlsbad, CA, USA), while HDF were cultured in Medium 106 supplemented with LSGS (Low Serum Growth Supplement) (both from Life Technologies). Cells where then treated with vehicle or 170 nM Compound 4 for 0, 0.5, 1, 2, 4, 8, 24, 48 and 72 hours. RNA was extracted using a Qiagen RNeasy mini kit and biotinylated using an Illumina TotalPrep RNA Amplification Kit (Ambion, Austin, TX, USA). Labelled RNA was hybridised to HumanHT-12 v4 BeadChip Arrays (Illumina Inc, San Diego, CA, USA) and scanned according to standard Illumina protocols. Data were extracted in GenomeStudio (Illumina) using default analysis settings and no normalisation method. Resulting data were imported into GeneSpring GX (Agilent, Santa Clara, CA, USA. Expression values were normalised using quantile normalisation with default settings.

In both HDF and HEKa in vitro, treatment with Compound 4 (170 nM) induced significant upregulation of two critical chemokines/cytokines involved in PMNL recruitment (IL8, CXCL1) within 2 to 4 hours. In HEKa, Compound 4 significantly upregulated production of host defence peptides (DEFB2, DEFB3, DEFB4, RNASE7) from 8 to 72 hours post treatment.

Example 7: Epoxytiglienone Treatment Induces NETosis/Necrosis and Release of the Antimicrobial Peptide Cathelicidin LL-37 In Vitro from Isolated Human Neutrophils Neutrophils are the most abundant leukocyte in the blood and constitute the first line of host defense against infectious pathogens. Central to their function is their ability to be recruited to sites of infection, to recognize microbes, and then be activated to kill pathogens through a combination of phagocytotic and cytotoxic mechanisms. Amongst these mechanisms used by neutrophils to kill pathogens are: (i) the production of reactive oxygen species, (ii) the expulsion of their nuclear chromatin contents (coated with histones, proteases and granular and cytosolic proteins) to immobilise and catch pathogens (the process of NETosis), and (iii) the release of antimicrobial peptides.

Subsequent to identifying the effect of epoxytiglienone compounds in upregulating production in HDF and HEKa of chemokines and cytokines involved in neutrophil recruitment (see Example 6 above), the effect of Compound 4 on two aspects of neutrophil function, induction of NETosis/necrosis and antimicrobial peptide release, were examined.

For these assays, neutrophils were isolated from fresh blood of a healthy human donor by lysis of a red blood cell pellet that had been obtained by Ficoll-Paque sedimentation. The neutrophils (~4×10$^6$ cells/mL) were incubated with 10 µg/mL dihydroethidium (DHE) (Sigma-Aldrich) in complete culture medium at 37° C. for 15 min alongside an aliquot of unstained cells to be tested as unstained control.

NETosis/necrosis assays followed methods fully described by Brinkmann et al. 2010. Isolated neutrophils were plated into 96-well plates (RPMI1640, 10% FCS) and incubated with a 1:50,000 dilution of Hoescht (10 mg/mL) and Sytox® Green (5 mM). Compound 4 was added at six concentrations (0.005, 0.05, 0.5. 5, 50, 500 µM) and the cells incubated at 37° C., 5% $CO_2$. Vehicle treated controls were included in all assays and there were three replicates of each assay. Hoescht/Sytox® Green fluorescence images were recorded for each well at 3 and 6 hours.

Figure 8:
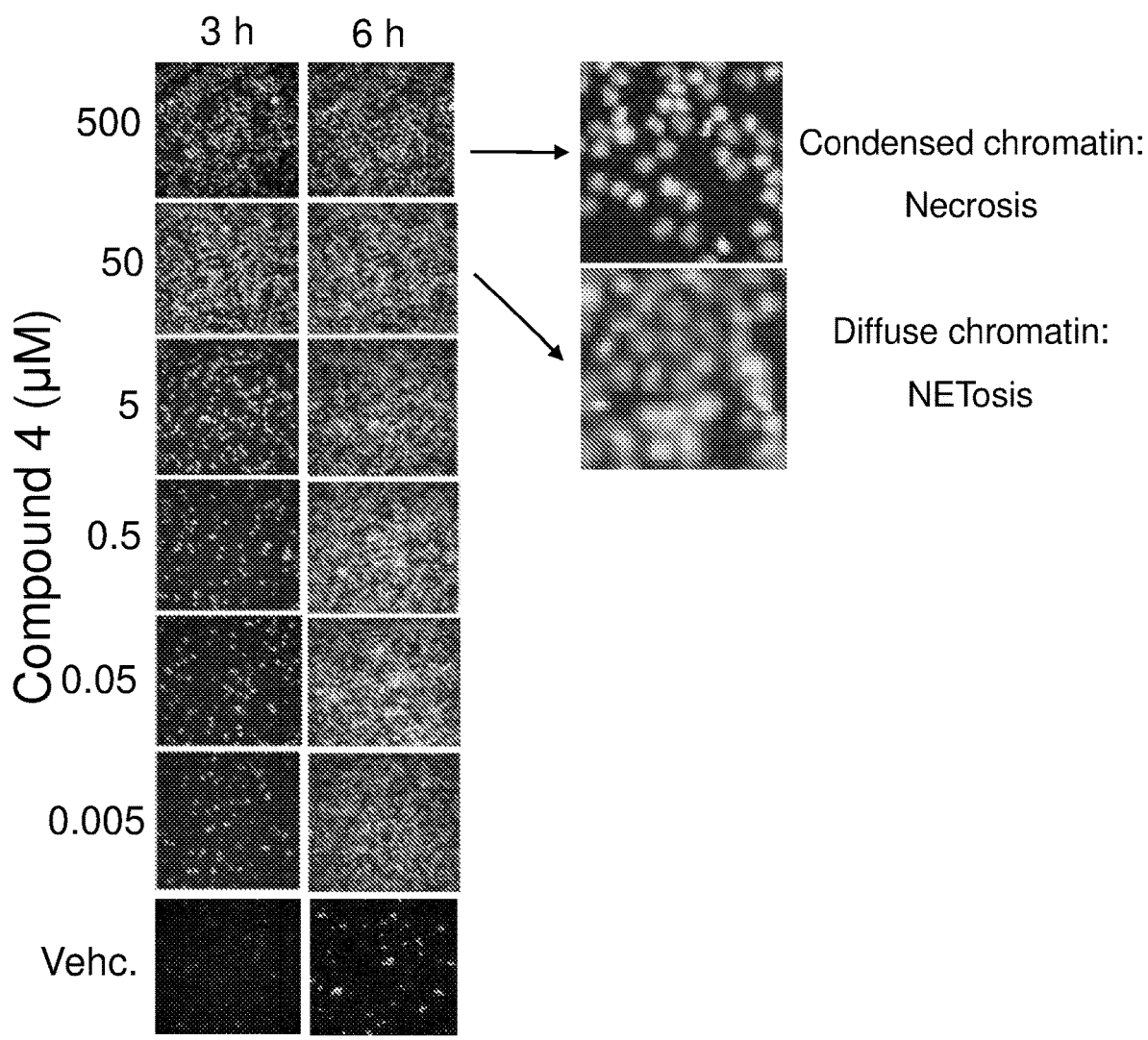
FIG. 8 provides representative images showing the induction of NETosis and necrosis of neutrophils treated with six concentrations of Compound 4 at two times after treatment, 3 and 6 hours. NETosis/necrosis was first observed at 3 hours after treatment in the two highest concentrations (50 and 500 µM) and at 6 hours in the four lower concentrations. At 500 µM the chromatin in the cells is condensed and indicates necrosis has occurred. At 50 µM the chromatin is more diffuse indicating that NETosis has occurred.

NETosis and necrosis of neutrophils was initially observed at 3 hours after treatment in the two highest concentrations (50 µM and 500 µM) of Compound 4 and was evident at 6 hours in the four lower concentrations (0.005 µM-5 µM; FIG. 8).

To examine antimicrobial peptide release by neutrophils in response to treatment with Compound 4, isolated neutrophils were incubated with either vehicle or Compound 4 at the four concentrations (62.5, 125, 250 and 500 µM). At 3 h, cell culture supernatants were removed and tested for LL-37 content using a LL-37-directed ELISA kit (Hycult Biotech). ELISA readings were normalised to vehicle only controls to determine fold increases in LL-37 release.

Figure 9:
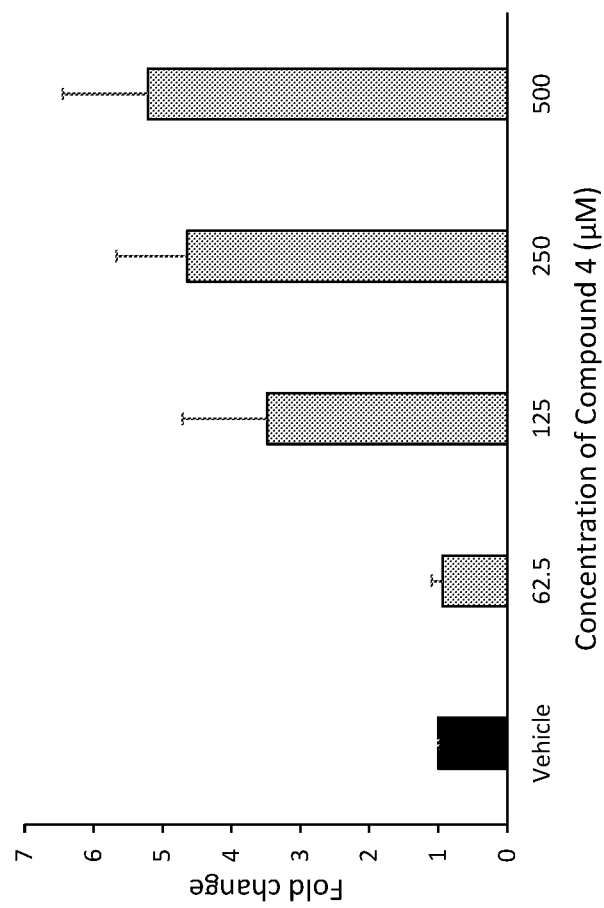
FIG. 9 provides a graph with mean values and standard deviations for in vitro release of human defence peptide LL-37 from neutrophils at 3 hours after application of four therapeutically relevant concentrations of Compound 4. Release of LL-37 from neutrophils increased in a concentration dependent manner.

Release of LL-37 from neutrophils at 3 hours after treatment with Compound 4 increased in a concentration dependent manner (FIG. 9). At concentrations of Compound 4 of between 125 and 500 µM, LL-37 release was 3- to 5-fold higher than the control treatment (FIG. 9).

The data from this Example show that at therapeutically relevant concentrations in vitro, Compound 4 induces suicidal neutrophil NETosis transitions to necrosis, leading to the release of the potent antimicrobial defence peptide LL-37.

The data from Examples 6 and 7 above also demonstrate that in addition to their direct effects in disrupting the structure of Gram-negative biofilms, epoxytiglienones can also induce local innate immune responses in both migratory/resident myeloid cells (e.g. neutrophils) and in dermal and stromal cell types. Such responses suggest that the effect of epoxytiglienones alone may be adequate to resolve many biofilm infections without the need for conventional antibiotics.

REFERENCES

It is to be understood that, if any prior art publication is referred to herein, such reference does not constitute an admission that the publication forms a part of the common general knowledge in the art, in Australia or any other country.

Brinkmann V et al. 2010. Neutrophil extracellular traps: How to generate and visualize. *Them. J. Vis. Exp.* 36: e 1724.

Cao, H. et al. (2016) Revealing region-specific biofilm viscoelastic properties by means of a micro-rheological approach. *npj Biofilms and Microbiomes,* 2(1), pp. 1-7.

Cepas V et al. 2019. Relationship between biofilm formation and antimicrobial resistance in Gram-negative bacteria. *Microb. Drug Resist.* 25: 72-79.

Dhall S et al. 2014. "Generating and Reversing Chronic Wounds in Diabetic Mice by Manipulating Wound Redox Parameters." *J. Diabetes Res.* 562625.

Doi et al. 2017. Gram-negative bacterial infections: Research priorities, accomplishments and future directions. *Clin Infect Dis.* 64 (S1): S30-S35 Fleming D & Rumbaugh K P 2017. Approaches to dispersing medical biofilms. *Microorganisms* 2017 5, 15.

Gunn J S et al. 2016. What's on the outside matters: the role of extracellular polymeric substance of Gram-negative biofilms in evading host immunity and as a target for therapeutic intervention. *J. Biol. Chem.* 291: 12538-12546.

Hoiby et al. 2010. Antibiotic resistance of bacterial biofilms. *Int. J. Antimicrob. Agents* 35: 322-332.

Hoiby N et al. 2015. ESCMID guideline for the diagnosis and treatment of biofilm infections. *Clin. Microbiol. Infect.* 21 (Suppl. 1): S1-S25.

Ho J et al. 2010. Multiresistant Gram-negative infections: a global perspective. *Curr. Opin. Infect. Dis.* 23: 546-53.

Jorgensen J J H et al. 1999. Antibacterial susceptibility tests: dilution and disk diffusion methods. In Murray P R et al. (Eds.), *Manual of Clinical Microbiology* (pp 1526-1543). Washington, D C: ASM Press.

Koo H et al. 2017. Targeting microbial biofilms: current and prospective therapeutic strategies. *Nat. Rev. Microbiol.* 15: 740-755.

Powell et al. 2018 Targeted disruption of the extracellular polymeric network of *Pseudomonas aeruginosa* biofilms by alginate oligosaccharides. *NPJ Biofilms Microbiomes.* 4: 13.

Zhao et al. 2010. Delayed wound healing in diabetic (db/db) mice with *Pseudomonas aeruginosa* biofilm challenge: a model for the study of chronic wounds. *Wound Repair Regen.* 18: 467-477.

The invention claimed is:
1. A method of treating a bacterial infection comprising a biofilm comprising Gram-negative bacteria, said method comprising locally administering to the bacterial infection an epoxytiglienone compound of formula (I):

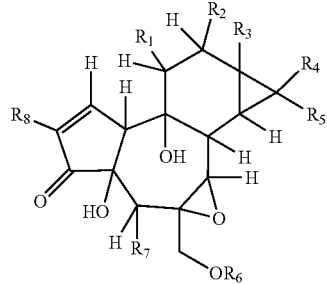

(I)

wherein
- $R_1$ is selected from hydrogen and $C_{1-6}$alkyl;
- $R_2$ is selected from —$OC_{1-8}$alkyl, —$OC_{2-8}$alkenyl, —$OC_{2-8}$alkynyl, —$OC(O)C_{1-7}$alkyl, —$OC(O)C_{2-7}$alkenyl and —$OC(O)C_{2-7}$alkynyl;
- $R_3$ is selected from —OH, —$OC_{1-8}$alkyl, —$OC_{2-8}$alkenyl, —$OC_{2-8}$alkynyl, —$OC(O)C_{1-7}$alkyl, —$OC(O)C_{2-7}$alkenyl and —$OC(O)C_{2-7}$alkynyl;
- $R_4$ and $R_5$ are independently selected from hydrogen and $C_{1-6}$alkyl;
- $R_6$ is selected from hydrogen, —$C_{1-6}$alkyl, —$C_{2-6}$alkenyl, —$C_{2-6}$alkynyl, —$C(O)C_{1-6}$alkyl, —$C(O)C_{2-6}$alkenyl, —$C(O)C_{2-6}$alkynyl, —$C(O)C_{3-8}$cycloalkyl, —$C(O)C_{1-6}$alkyl$C_{3-8}$cycloalkyl, —$C(O)C_{2-6}$alkenyl$C_{3-8}$cycloalkyl, —$C(O)C_{2-6}$alkynyl$C_{3-8}$cycloalkyl, —$C(O)$aryl, —$C(O)C_{1-6}$alkylaryl, —$C(O)C_{2-6}$alkenylaryl and —$OC(O)C_{2-6}$alkynylaryl;
- $R_7$ is selected from hydroxy, —$OC_{1-6}$alkyl, —$OC_{2-6}$alkenyl, —$OC_{2-6}$alkynyl, —$OC(O)C_{1-6}$alkyl, —$OC(O)C_{2-6}$alkenyl, —$OC(O)C_{2-6}$alkynyl, —$C(O)C_{3-8}$cycloalkyl, —$C(O)C_{1-6}$alkyl$C_{3-8}$cycloalkyl, —$C(O)C_{2-6}$alkenyl$C_{3-8}$cycloalkyl, —$C(O)C_{2-6}$alkynyl$C_{3-8}$cycloalkyl, —$OC(O)$aryl, —$OC(O)C_{1-6}$alkylaryl, —$C(O)C_{2-6}$alkenylaryl and —$C(O)C_{2-6}$alkynylaryl; and
- $R_8$ is selected from hydrogen and $C_{1-6}$alkyl; or a pharmaceutically acceptable salt thereof.

2. The method according to claim 1 wherein the local administration is topical administration.

3. The method according to claim 1 wherein the infection is a post-surgical infection or an infection at the site of insertion of a medical device or implantation of an implant.

4. The method according to claim 1 wherein the bacterial infection is a chronic infection.

5. The method according to claim 1 wherein the administration is in combination with an antibiotic to which the Gram-negative bacteria is susceptible when in planktonic state.

6. The method according to claim 1, wherein one or more of the following applies:
  i) $R_1$ is $C_{1-3}$alkyl;
  ii) $R_2$ is selected from —$OC(O)C_{1-7}$alkyl, —$OC(O)C_{2-7}$alkenyl and —$OC(O)C_{2-7}$alkynyl;
  iii) $R_3$ is selected from —$OC(O)C_{1-7}$alkyl, —$OC(O)C_{2-7}$alkenyl and —$OC(O)C_{2-7}$alkynyl;
  iv) $R_4$ and $R_5$ are each methyl;
  v) $R_6$ is selected from hydrogen, —$C(O)C_{1-6}$alkyl, —$C(O)C_{2-6}$alkenyl, —$C(O)C_{2-6}$alkynyl and —$C(O)$aryl;
  vi) $R_7$ is hydroxyl, —$OC(O)C_{1-6}$alkyl, —$OC(O)C_{2-6}$alkenyl or —$OC(O)C_{2-6}$alkynyl; and
  vii) $R_8$ is $C_{1-3}$alkyl.

7. The method according to claim 6, wherein $R_2$ is selected from —$OC(O)C_{3-6}$alkyl and —$OC(O)C_{3-6}$alkenyl.

8. The method according to claim 6, wherein $R_3$ is selected from —$OC(O)C_{3-6}$alkyl, —$OC(O)C_{3-6}$alkenyl and —$OC(O)C_{3-6}$alkynyl.

9. The method according to claim 6, wherein $R_6$ is selected from hydrogen, —$C(O)CH_3$, —$C(O)CH_2CH_3$, —$C(O)CH(CH_3)_2$ or —$C(O)CH_2CH_2CH_3$.

10. The method according to claim 1, wherein the alkyl or alkenyl group of $R_2$ and/or $R_3$ are branched alkyl or alkenyl groups.

11. The method according to claim 1, wherein the alkyl or alkenyl group of $R_2$ and/or $R_3$ are linear alkyl or alkenyl groups.

12. The method according to claim 1, wherein the compound of formula (I) is selected from:
- 12-tigloyl-13-(2-methylbutanoyl)-6,7-epoxy-4,5,9,12,13,20-hexahydroxy-1-tiglien-3-one (Compound 1);
- 12,13-di-(2-methylbutanoyl)-6,7-epoxy-4,5,9,12,13,20-hexahydroxy-1-tiglien-3-one (Compound 2);
- 12-hexanoyl-13-(2-methylbutanoyl)-6,7-epoxy-4,5,9,12,13,20-hexahydroxy-1-tiglien-3-one (Compound 3);
- 12,13-dihexanoyl-6,7-epoxy-4,5,9,12, 13,20-hexahydroxy-1-tiglien-3-one (Compound 4);
- 12-tigloyl-13-(2-methylbutanoyl)-6,7-epoxy-4,5,9,12, 13-pentahydroxy-20-acetyloxy-1-tiglien-3-one (Compound 5);
- 12-propanoyl-13-(2-methylbutanoyl)-6,7-epoxy-4,5,9, 12,13,20-hexahydroxy-1-tiglien-3-one (Compound 6);
- 12,13-ditigloyl-6,7-epoxy-4,5,9,12,13,20-hexahydroxy-1-tiglien-3-one (Compound 7);
- 12-(2-methylbutanoyl)-13-tigloyl-6,7-epoxy-4,5,9,12,13, 20-hexahydroxy-1-tiglien-3-one (Compound 8);
- 12-butanoyl-13-(2-methylbutanoyl)-6,7-epoxy-4,5,9,12, 13,20-hexahydroxy-1-tiglien-3-one (Compound 9);
- 12-(3,3-dimethylbut-2-enoyl)-13-(2-methylbutanoyl)-6, 7-epoxy-4,5,9,12,13,20-hexahydroxy-1-tiglien-3-one (Compound 10);
- 12-hex-2,4-dienoyl-13-(2-methylbutanoyl)-6,7-epoxy-4, 5,9,12,13,20-hexahydroxy-1-tiglien-3-one (Compound 11);
- 12-tigloyl-13-(2-methylpropanoyl)-6,7-epoxy-4,5,9,12, 13,20-hexahydroxy-1-tiglien-3-one (Compound 12);
- 12-but-2-enoyl-13-(2-methylbutanoyl)-6,7-epoxy-4,5,9, 12,13,20-hexahydroxy-1-tiglien-3-one (Compound 13);
- 12-tigloyl-13-butanoyl-6,7-epoxy-4,5,9,12,13,20-hexahydroxy-1-tiglien-3-one (Compound 14);
- 12, 13-dibutanoyl-6,7-epoxy-4,5,9,12, 13,20-hexahydroxy-1-tiglien-3-one (Compound 15);
- 12, 13-dipentanoyl-6,7-epoxy-4,5,9,12,13,20-hexahydroxy-1-tiglien-3-one (Compound 16);
- 12,13-di-(2E,4E)-hexa-2,4-dienoyl-6,7-epoxy-4,5,9,12, 13,20-hexahydroxy-1-tiglien-3-one (Compound 17);
- 12-(2-methylprop-2-enoyl)-13-(2-methylbutanoyl)-6,7-epoxy-4,5,9,12,13,20-hexahydroxy-1-tigliaen-3-one (Compound 19);
- 12,13-di-heptanoyl-6,7-epoxy-4,5,9,12, 13,20-hexahydroxy-1-tigliaen-3-one (Compound 20); and
- 12,13-di-(3-methylbutanoyl)-6,7-epoxy-4,5,9,12,13,20-hexahydroxy-1-tigliaen-3-one (Compound 21);

or a pharmaceutically acceptable salt thereof.

13. The method according to claim 1, wherein the biofilm comprising Gram-negative bacteria comprises at least one Gram-negative bacteria selected from *Pseudomonas* species, *Acinetobacter* species, *Aeromonas* species, *Bacteroides* species, *Bordetella* species, *Borrelia* species, *Burkholderia* species, *Citrobacter* species, *Compylobacter* species, *Escherichia* species, *Enterobacter* species, *Flavobacterium* species, *Fusobacterium* species, *Klebsiella* species, *Leptospira* species, *Neisseria* species, *Helicobacter* species, *Hemophilus* species, *Legionella* species, *Moraxella* species, *Yersinia* species, *Oligella* species, *Pantoea* Species, *Porphyromonas* species, *Prevotella* species, *Proteus* species, *Raoultella* species, *Salmonella* species, *Serratia* species, *Shigella* species, *Sphingomonas* species, *Stenotophomonas* species, *Treponema* species, *Veillonella* species and *Vibrio* species.

14. The method according to claim 13, wherein the Gram-negative bacteria is selected from *Pseudomonas aeruginosa, Acinetobacter baumannii, Escherichia coli, Klebsiella pneumoniae, Neisseria gonorrhoeae, Neisseria meningitidis, Hemophilus influenzae, Legionella pneumophila, Yersinia pestis, Yersinia enterocolitica, Salmonella enterica, Salmonella bongori, Proteus mirabilis, Enterobacter cloacae, Serratia marcescens, Bacteroides fragilis, Fusobacterium necrophorum, Burkholderia cepacian* and *Prevotella intermedia*.

\* \* \* \* \*